United States Patent
Kondo et al.

(10) Patent No.: US 7,606,431 B2
(45) Date of Patent: *Oct. 20, 2009

(54) IMAGE PROCESSING APPARATUS, IMAGE PROCESSING METHOD, AND STORAGE MEDIUM

(75) Inventors: Tetsujiro Kondo, Tokyo (JP); Naoki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 394 days.

This patent is subject to a terminal disclaimer.

(21) Appl. No.: 10/915,806

(22) Filed: Aug. 11, 2004

(65) Prior Publication Data

US 2005/0008192 A1 Jan. 13, 2005

Related U.S. Application Data

(62) Division of application No. 09/587,838, filed on Jun. 6, 2000, now Pat. No. 6,870,944.

(30) Foreign Application Priority Data

Jun. 8, 1999 (JP) .................. 11-160529
Jun. 8, 1999 (JP) .................. 11-160530

(51) Int. Cl.
*G06K 9/36* (2006.01)

(52) U.S. Cl. ...................... 382/233; 382/100

(58) Field of Classification Search ........ 382/100, 382/232, 233, 282, 297, 278; 358/3.28; 380/54
See application file for complete search history.

(56) References Cited

U.S. PATENT DOCUMENTS

| 5,734,752 | A | * | 3/1998 | Knox ................... 358/3.28 |
| 5,835,639 | A | * | 11/1998 | Honsinger et al. ......... 382/278 |
| 5,930,369 | A | * | 7/1999 | Cox et al. .................. 380/54 |
| 6,005,643 | A | * | 12/1999 | Morimoto et al. ...... 375/240.26 |
| 6,567,531 | B1 | * | 5/2003 | Kondo et al. ............... 382/100 |
| 6,804,372 | B1 | * | 10/2004 | Kondo et al. ............... 382/100 |

FOREIGN PATENT DOCUMENTS

| JP | 2000 184173 | 6/2000 |
| JP | 2000 216982 | 8/2000 |

OTHER PUBLICATIONS

Knox: "Reversible Digital Images" Proceedings of The SPIE, vol. 3657, Jan. 25-27, 1999, pp. 397-401, XP000949157 San Jose, CA USA.

* cited by examiner

*Primary Examiner*—Duy M Dang
(74) *Attorney, Agent, or Firm*—Frommer Lawrence & Haug LLP; William S. Frommer; Thomas F. Presson

(57) ABSTRACT

An image processing apparatus embeds information into image data without an overhead. The image processing apparatus includes a selection unit for selecting some of the pixels forming the image data. A changing unit embeds the information into the pixels selected by the selection unit by swapping the bits of the values of the selected pixels according to the information.

8 Claims, 22 Drawing Sheets

IMAGE

○ : PIXEL VALUE DETERMINED

⦸ ● : PIXEL VALUE NOT YET DETERMINED

○ : PIXEL VALUE DETERMINED

◐ ● : PIXEL VALUE NOT YET DETERMINED

IMAGE PROCESSING APPARATUS, IMAGE PROCESSING METHOD, AND STORAGE MEDIUM

This application is a division of application Ser. No. 09/587,838, filed Jun. 6, 2000, now U.S. Pat. No. 6,870,944 issued on Mar. 22, 2005.

BACKGROUND OF THE INVENTION

1. Field of the Invention

The present invention generally relates to image processing apparatuses, image processing methods, and storage media. More particularly, the invention relates to an image processing apparatus and an image processing method for embedding information into images with the minimum loss in the quality of reproduced images and without increasing the amount of data. The invention also relates to a storage medium for storing the above-described method.

2. Description of the Related Art

One of the techniques of embedding information without increasing the amount of data is to convert the least significant bit (LSB) or the lower two bits of, for example, digital audio data into information to be embedded. In this technique, the lower bits of digital audio data, which do not significantly influence the sound quality, are simply substituted for the information to be embedded. Accordingly, when the digital audio data is reproduced, it is output as it is without restoring the lower bits into the original state. More specifically, since it is difficult to restore the lower bits embedded with information into the original state, and also, since the lower bits do not significantly influence the sound quality, the digital audio data is output while containing information embedded therein.

According to the above-described technique, however, a signal different from the original signal is disadvantageously output, which, to some degree, affects the sound quality if the signal is audio data, or influences the image quality if the signal is video data.

SUMMARY OF THE INVENTION

Accordingly, it is an object of the present invention to solve the above-described problems.

In order to achieve the above object, according to one aspect of the present invention, there is provided an image processing apparatus for embedding information into image data. The image processing apparatus includes a selection unit for selecting some pixels forming the image data, and a changing unit for embedding the information into the pixels selected by the selection unit by swapping bits of values of the selected pixels according to the information.

According to another aspect of the present invention, there is provided an image processing apparatus for decoding coded image data embedded with information into original image data and the information. The image processing apparatus includes a selection unit for selecting some pixels forming the coded image data. A changing unit swaps bits of values of the pixels selected by the selection unit. A correlation computing unit computes a correlation between the changed pixels and pixels other than the pixels selected by the selection unit. A determining unit determines, based on the correlation computed by the correlation computing unit, an amount by which the selected pixel values are to be changed, the amount being used for decoding the selected pixels. A decoding unit decodes the selected pixels based on the amount determined by the determining unit and decodes the information which is embedded into the selected pixels.

According to still another aspect of the present invention, there is provided an image processing apparatus for decoding coded image data embedded with information into original image data and the information. The image processing apparatus includes a selection unit for selecting some pixels forming the coded image data. A computing unit computes an exclusive-OR between values of the pixels selected by the selection unit and predetermined data. A correlation computing unit computes a correlation between the pixels computed by the computing unit and pixels other than the selected pixels. A determining unit determines, based on the correlation computed by the correlation computing unit, the predetermined data used for computing the exclusive-OR with the selected pixels in order to decode the selected pixels. A decoding unit decodes the selected pixels based on the data determined by the determining unit and decodes the information which is embedded into the selected pixels.

According to a further aspect of the present invention, there is provided an image processing method for embedding information into image data. The image processing method includes a selection step of selecting some pixels forming the image data, and an embedding step of embedding the information into the pixels selected in the selection step by swapping bits of values of the selected pixels according to the information.

According to a yet further aspect of the present invention, there is an image processing method for decoding coded image data embedded with information into original image data and the information. The image processing method includes: a selection step of selecting some pixels forming the coded image data; a swapping step of swapping bits of values of the pixels selected in the selection step; a correlation computing step of computing a correlation between the swapped pixels and pixels other than the selected pixels; a determining step of determining, based on the correlation computed in the correlation computing step, an amount by which the selected pixel values are to be changed, the amount being used for decoding the selected pixels; and a decoding step of decoding the selected pixels based on the amount determined in the determining step and decoding the information which is embedded into the selected pixels.

According to a further aspect of the present invention, there is provided an image processing method for decoding coded image data embedded with information into original image data and the information. The image processing method includes: a selection step of selecting some pixels forming the coded image data; a computing step of computing an exclusive-OR between values of the pixels selected in the selection step and predetermined data; a correlation computing step of computing a correlation between the pixels computed in the computing step and pixels other than the selected pixels; a determining step of determining, based on the correlation computed in the correlation computing step, the predetermined data used for computing the exclusive-OR with the selected pixels in order to decode the selected pixels; and a decoding step of decoding the selected pixels based on the predetermined data determined in the determining step and decoding the information which is embedded into the selected pixels.

According to a further aspect of the present invention, there is provided a storage medium for storing a computer-controlling program for embedding information into image data. The program includes a selection step of selecting some pixels forming the image data, and an embedding step of embedding the information into the pixels selected in the selection step by swapping bits of values of the selected pixels according to the information.

According to a further aspect of the present invention, there is provided a storage medium for storing a computer-controlling program for decoding coded image data embedded with information into original image data and the information. The program includes: a selection step of selecting some pixels forming the coded image data; a swapping step of swapping bits of values of the pixels selected in the selection step; a correlation computing step of computing a correlation between the swapped pixels and pixels other than the selected pixels; a determining step of determining, based on the correlation computed in the correlation computing step, an amount by which the selected pixel values are to be changed, the amount being used for decoding the selected pixels; and a decoding step of decoding the selected pixels based on the amount determined in the determining step and decoding the information which is embedded into the selected pixels.

According to a further aspect of the present invention, there is provided a storage medium for storing a computer-controlling program for decoding coded image data embedded with information into original image data and the information. The program includes: a selection step of selecting some pixels forming the coded image data; a computing step of computing an exclusive-OR between values of the pixels selected in the selection step and predetermined data; a correlation computing step of computing a correlation between the pixels computed in the computing step and pixels other than the selected pixels; a determining step of determining, based on the correlation computed in the correlation computing step, the predetermined data used for computing the exclusive-OR with the selected pixels in order to decode the selected pixels; and a decoding step of decoding the selected pixels based on the predetermined data determined in the determining step and decoding the information which is embedded into the selected pixels.

DESCRIPTION OF THE PREFERRED EMBODIMENTS

The present invention is described in detail below with reference to the accompanying drawings through illustration of preferred embodiments.

Figure 1:
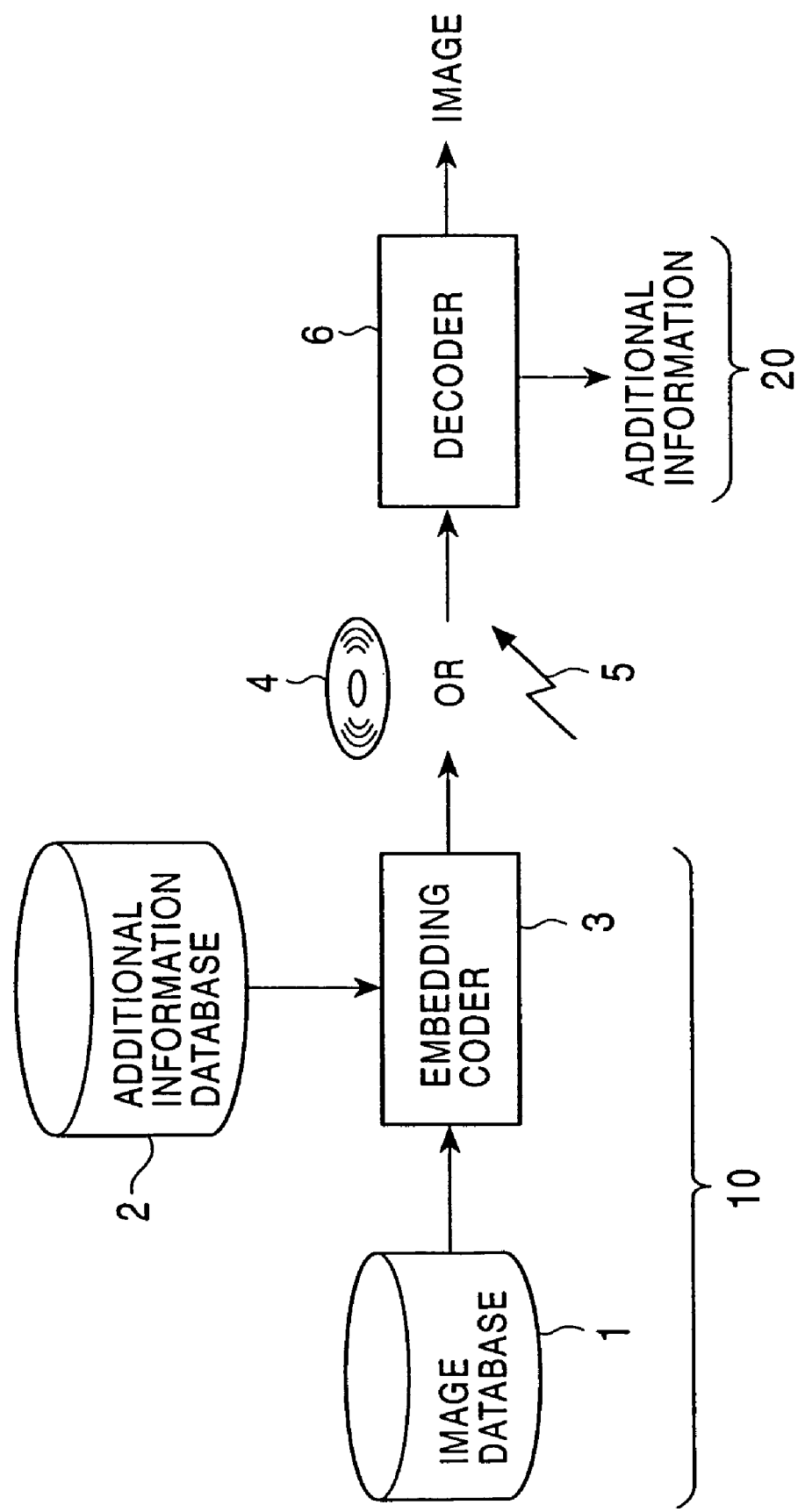
FIG. 1 is a block diagram illustrating an example of the configuration of an image transmission system incorporating the present invention.

FIG. 1 is a schematic diagram illustrating an image transmission system incorporating the present invention. In this specification, a "system" may be a unit logically formed of a plurality of apparatuses, and it is not necessary that the apparatuses be contained in the same housing.

Referring to FIG. 1, the image transmission system is formed of a coding apparatus 10 and a decoding apparatus 20.

The coding apparatus 10 codes, for example, an image, and outputs the coded data. The decoding apparatus 20 reproduces the original image from the coded data.

More specifically, an image database 1 stores images to be coded (for example, digital images), and an image is read from the image database 1 and is supplied to an embedding coder 3. An additional-information database 2 stores additional information (digital data) as information to be embedded in the image to be coded. The additional information is read from the additional-information database 2 and is supplied to the embedding coder 3.

Upon receiving the image from the image database 1 and the additional information from the additional-information database 2, the embedding coder 3 codes the image in accordance with the additional information supplied from the additional-information database 2 so that the coded image can be decoded by utilizing the energy distribution of the image supplied from the image database 1. That is, the embedding coder 3 codes the image by embedding the additional information in the image so that the coded image can be decoded by utilizing the energy distribution of the image, and outputs the coded data. The coded data may then be recorded in a storage medium 4, such as a magneto-optical disk, a magnetic disk, an optical disc, a magnetic tape, a PD disk, or a semiconductor memory. Alternatively, the coded data may be transmitted to the decoding apparatus 20 via a transmission medium 5, such as a terrestrial broadcast signal, a satellite broadcast signal, a cable television (CATV) network, the Internet, or a public network.

The decoding apparatus 20 is formed of a decoder 6 in which the coded data provided via the storage medium 4 or the transmission medium 5 is received. The decoder 6 further decodes the coded data into the original image and into the additional information by utilizing the energy distribution of the image. The decoded image is then supplied to a monitor (not shown) and is displayed. The decoded additional information is used for performing predetermined processing.

The principle of the coding operation performed by the embedding coder 3 and the decoding operation performed by the decoder 6 shown in FIG. 1 is described below.

Generally, what is called "information" possesses an energy (entropy) distribution, which is identified as information (valuable information). More specifically, for example, an image obtained by photographing a landscape can be identified as an image of the landscape. This is because the image (the values of the pixels forming the image) possesses an energy distribution corresponding to the landscape. An image without an energy distribution is merely noise, and is useless as information.

Consequently, even if the energy distribution possessed by a piece of valuable information is destroyed by performing a certain operation, the original information can be reproduced by restoring the destroyed energy distribution to the original state. That is, the coded data obtained by coding the information can be decoded into the original information by utilizing the energy distribution inherent in the information.

The energy distribution of information can be represented by, for example, correlation. The correlation of information is the correlation between the elements of the information (for example, if the information is an image, the pixels or the lines forming the image), i.e., the self-correlation or the distance between the elements forming the information.

Figure 2:
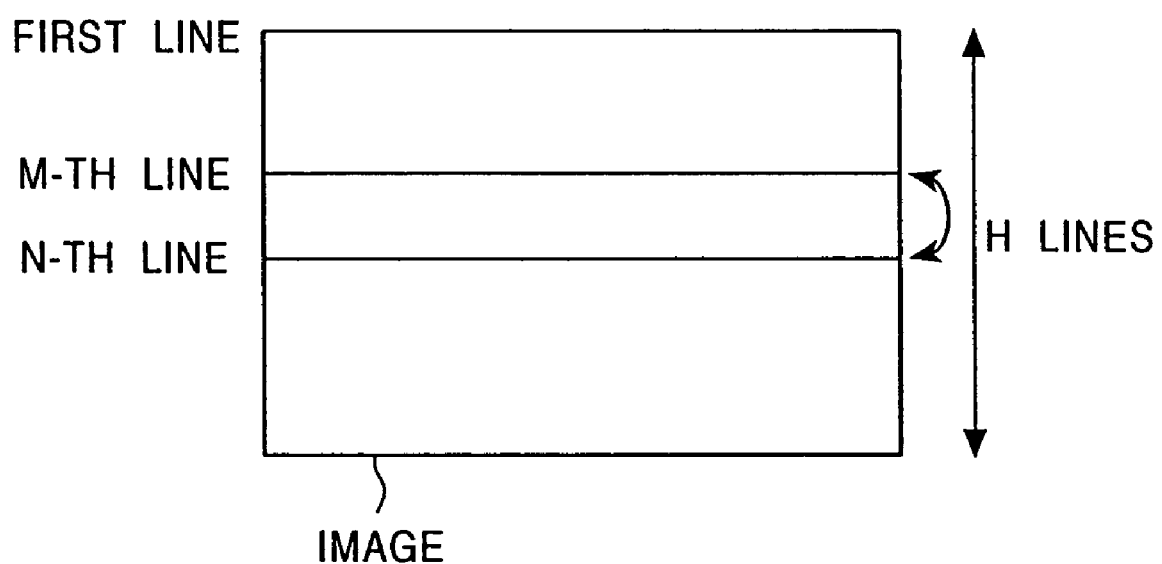
FIG. 2 illustrates an image to be coded in an embedding coder 3 shown in FIG. 1.

An image formed of H lines, such as that shown in FIG. 2, is taken as an example. Concerning the correlation between the first line and another line, as illustrated in (A) of FIG. 3, the correlation of the first line to a line located close to the first line (an upper line of the image shown in FIG. 2) is great. Conversely, the correlation of the first line to a line positioned far from the first line (a lower line of the image shown in FIG. 2) is small. In other words, the image shown in FIG. 2 has a correlation variation in which a line closer to the first line has a greater level of correlation, and a line farther from the first line has a smaller level of correlation.

In the image shown in FIG. 2, the M-th line closer to the first line and the N-th line farther from the first line are swapped ($1<M<N\leq H$), and after calculating the correlation between the first line and each of the M-th line and the N-th line, the resultant image may be indicated, as shown in FIG. 3B. That is, in the image in which the M-th line and the N-th line have been swapped, the correlation of the first line to the M-th line closer to the first line (corresponding to the N-th line before being swapped) becomes smaller, while the correlation of the first line to the N-th line farther from the first line (corresponding to the M-th line before being swapped) becomes greater.

Figure 3:
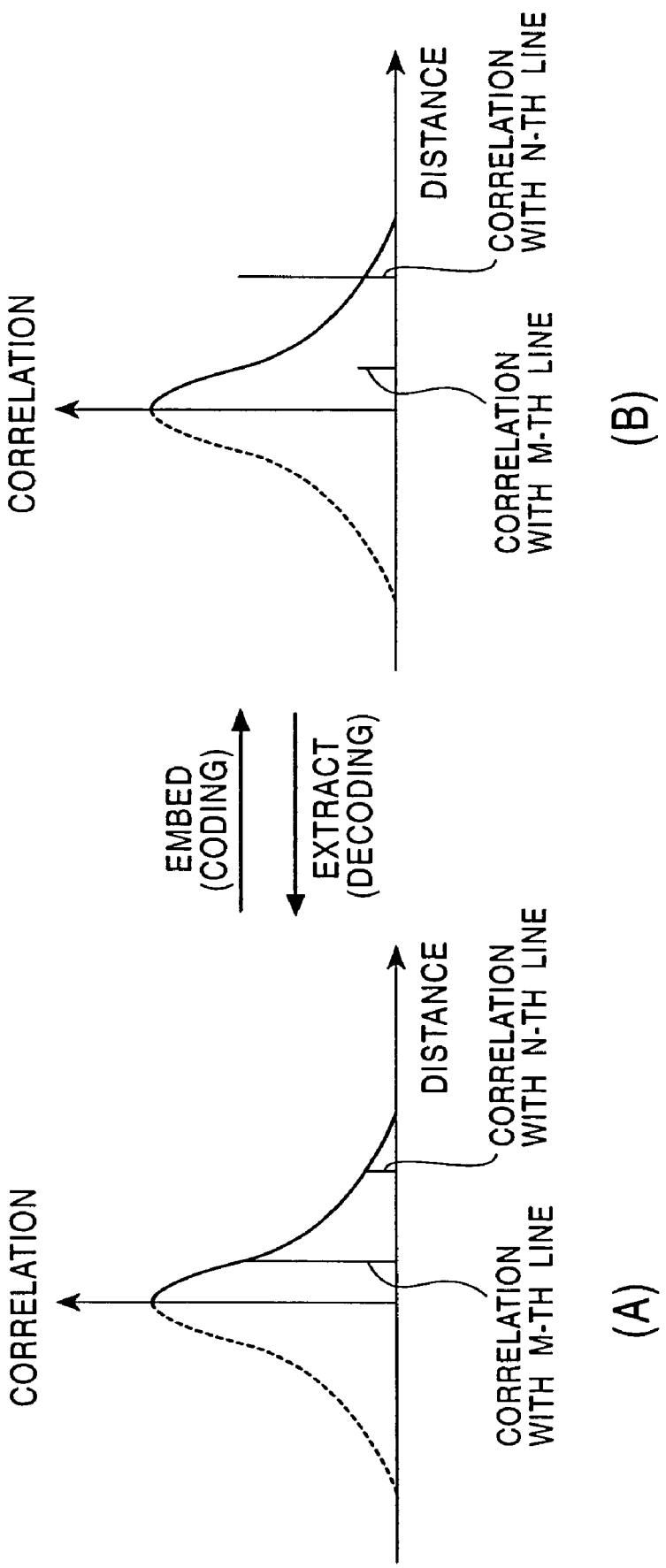
FIG. 3 illustrates the energy distribution of information by relationships between the distance and the correlation and also illustrates that the energy distribution is destroyed by swapping some lines of the information.

Thus, the original correlation variation is destroyed in the correlation shown in (B) of FIG. 3. Generally, however, concerning images, the destroyed correlation variation can be restored to the original state by utilizing the original correlation variation. That is, the correlation variation shown in (B) of FIG. 3 is unnatural (incorrect) in terms of the original correlation variation possessed by the image, and the M-th line and the N-th line should be swapped. Thus, the unnatural variation can be restored to the correct variation shown in (A) of FIG. 3, so that the original image can be decoded.

According to the example shown in FIG. 2 and (A) and (B) of FIG. 3, the image is coded by exchanging the lines. In this case, the embedding coder 3 determines which lines should be moved and swapped according to the additional information. Meanwhile, the decoder 6 returns the swapped lines to the original positions by utilizing the correlation, i.e., replaces the coded image by the original image, thereby decoding the coded image. During the decoding operation, the decoder 6 detects which lines have been moved and swapped so as to decode the additional information embedded in the image.

Figure 4:
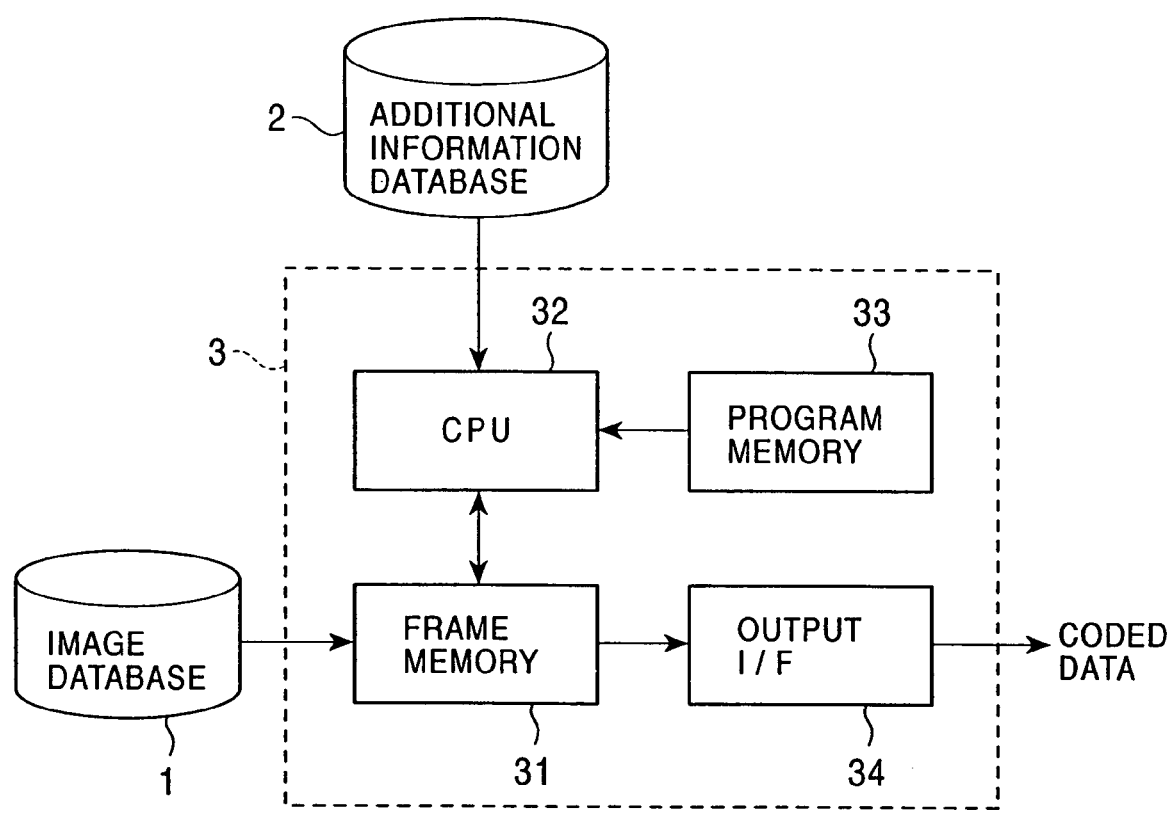
FIG. 4 is a block diagram illustrating an example of the hardware configuration of the embedding coder 3 shown in FIG. 1.

FIG. 4 illustrates an example of the configuration of the embedding coder 3 shown in FIG. 1 that performs embed-coding by embedding additional information in an image so that the coded image can be decoded into the original image by utilizing the correlation of the image.

Images output from the image database 1 are supplied to a frame memory 31 in which the images are temporarily stored, for example, in units of frames.

A central processing unit (CPU) 32 performs embed-coding processing, which will be described below, by executing a program stored in a program memory 33. That is, the CPU 32 embeds additional information supplied from the additional-information database 2 in the image stored in the frame memory 31.

The program memory 33 is formed of, for example, a read only memory (ROM) or a random access memory (RAM), and stores a computer program for enabling the CPU 32 to execute the embed-coding processing. An output interface (I/F) 34 reads an image having additional information embedded therein from the frame memory 31 and outputs it as coded data.

The frame memory 31 is formed of a plurality of banks so that a plurality of frames can be stored. By switching the banks, the frame memory 31 simultaneously stores the image supplied from the image database 1 and the pixels of the image to be processed by the CPU 32. Concurrently, the frame memory 31 also outputs the image having the embedded information therein (coded data). With this arrangement, the coded data can be output in real time even if the image supplied from the image database 1 is a moving picture.

Figure 5:
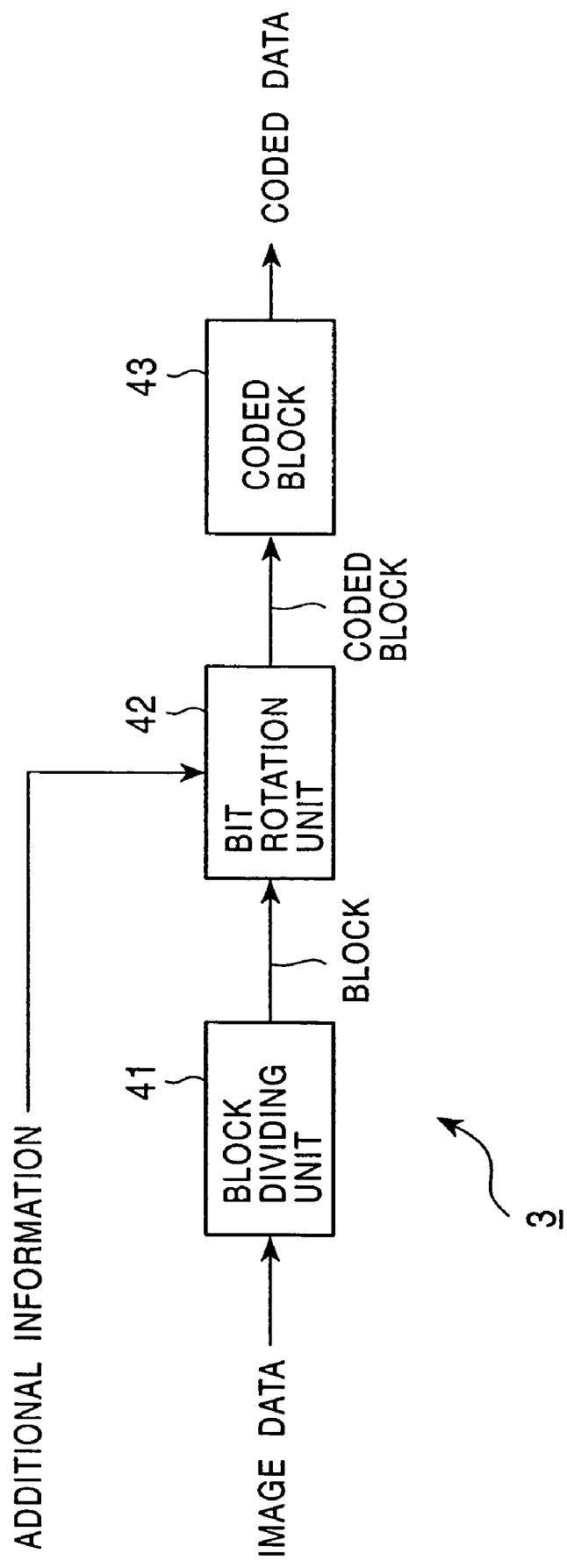
FIG. 5 is a block diagram illustrating the functional configuration of the embedding coder 3 shown in FIG. 4 according to a first embodiment of the present invention.

FIG. 5 illustrates an example of the functional configuration of the embedding coder 3 which can be implemented by executing the program stored in the program memory 33 by the CPU 32 shown in FIG. 4 according to a first embodiment of the present invention.

Images to be coded are supplied to a block dividing unit 41, for example, in units of frames. The block dividing unit 41 divides a one-frame image into blocks, each having a predetermined size, and supplies the divided blocks to a bit rotation unit 42.

Not only the image blocks from the block dividing unit 41, but also additional information to be embedded into an image, is supplied to the bit rotation unit 42. The bit rotation unit 42 selects some of the pixels forming each image block and rotates the values of the pixels (hereinafter sometimes referred to as "selected pixels"), thereby embedding the additional information into the selected pixels. The block embedded with the additional information in the selected pixels is supplied to a coded-image memory 43 as a coded block.

The coded-image memory 43 sequentially stores coded blocks supplied from the bit rotation unit 42, and when coded blocks for one frame are stored, the coded-image memory 43 outputs the coded blocks as coded data.

Figure 6:
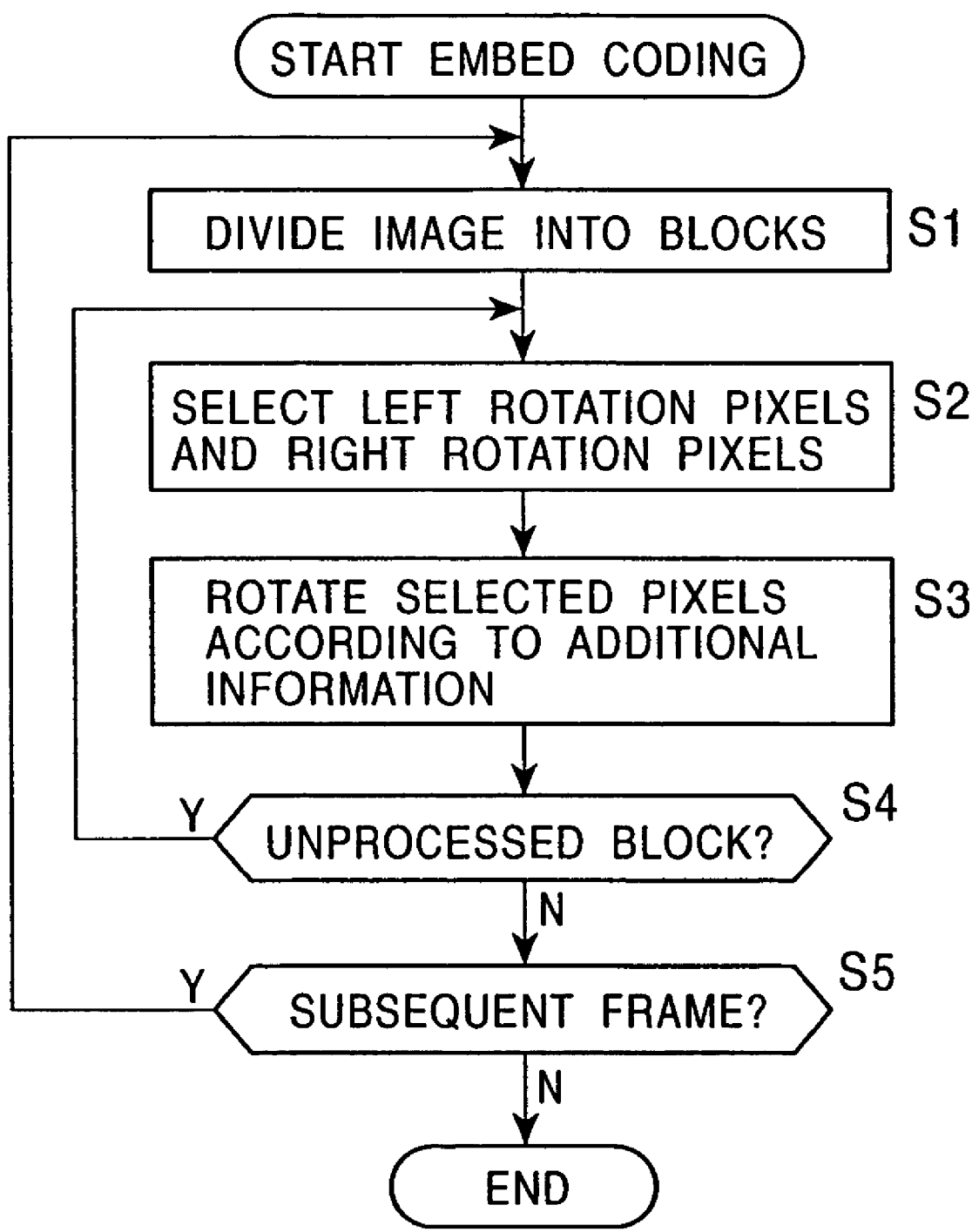
FIG. 6 is a flow chart illustrating embed-coding processing performed by the embedding coder 3 shown in FIG. 5.

A description is now given, with reference to the flow chart of FIG. 6, of embed-coding processing performed by the embedding coder 3 shown in FIG. 5.

As discussed above, images to be coded are supplied to the block dividing unit 41 in units of frames. Upon receiving an image for one frame, in step S1, the block dividing unit 41 divides the one-frame image into blocks, each having a predetermined size. More specifically, the block dividing unit 41 divides the image, as shown in (A) of FIG. 7, into 4×4-pixel image blocks. The image blocks divided by the block dividing unit 41 are then supplied to the bit rotation unit 42 in, for example, raster scanning order.

Upon receiving the image block from the block dividing unit 41, in step S2, the bit rotation unit 42 sets the received image block to be the current block and selects some of the pixels forming the current block. More specifically, among the pixels forming the current block, the bit rotation unit 42 selects pixels, such as those indicated by the black portions ● and the hatched portions shown in (A) of FIG. 7, according to a checkerboard pattern. That is, in step S2, one half the pixels forming the image block are selected.

In step S3, the values of the selected pixels are rotated by the bit rotation unit 42 according to the supplied additional information, so that the additional information can be embedded into the selected pixels. More specifically, the bit rotation unit 42 rotates the values of the selected pixels indicated by the hatched portions shown in (A) of FIG. 7 in the direction from the least significant bit (LSB) to the most significant bit (MSB) (hereinafter sometimes referred to as "left rotation") by the number of bits corresponding to the value of the additional information.

The term "rotation" used above is similar to bit shifting; however, when rotation is performed in the direction from the LSB to the MSB, the MSBs are not discarded but are shifted to the LSBs. Conversely, when rotation is performed in the direction from the MSB to the LSB, the LSBs are not discarded but are shifted to the MSBs.

Figure 7:
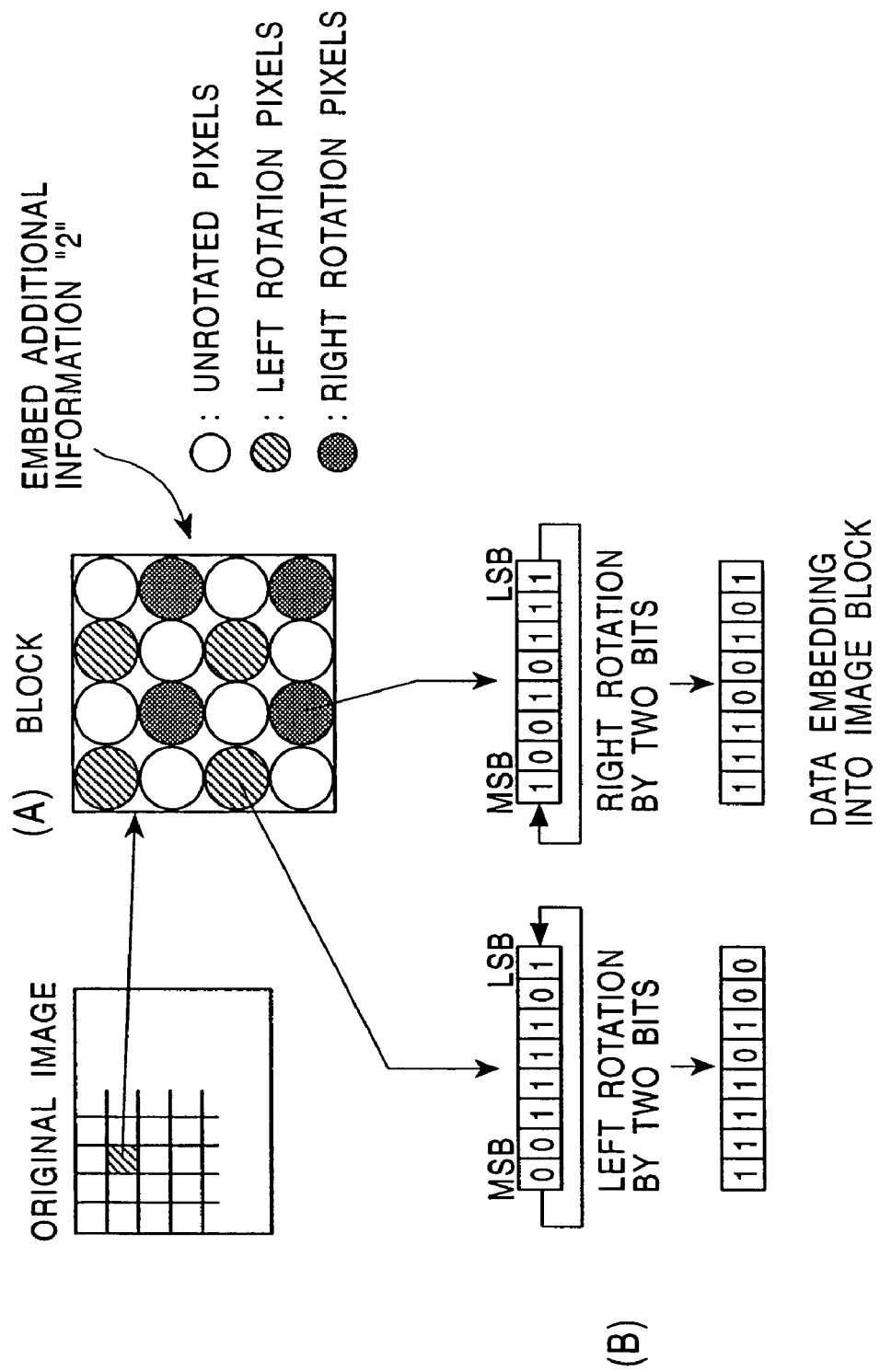
FIG. 7 illustrates pixels to be selected for each image block in performing the embed-coding processing shown in FIG. 6 and also illustrates the data embedding operation by rotating the selected pixels.

The bit rotation unit 42 also rotates the values of the selected pixels indicated by the black portions ● shown in (A) of FIG. 7 in the direction from the MSB to the LSB (hereinafter sometimes referred to as "right rotation") by the number of bits corresponding to the value of the additional information.

The pixels whose values are to be rotated to the left and those to be rotated to the right may be referred to as "left rotation pixels" and "right rotation pixels", respectively.

In this embodiment, the left rotation pixels and the right rotation pixels are alternately arranged in the diagonal direction in each image block, namely, one half the selected pixels is rotated to the left, while the other half is rotated to the right.

It is now assumed that a pixel has eight bits, and that the value of a left rotation pixel is 00111101B (B represents that the preceding number is binary) and the value of a right rotation pixel is 10010111B. It is also assumed that the additional information is "2". The left rotation pixel 00111101B and the right rotation pixel 10010111B are rotated to the left and to the right, respectively, by two bits, resulting in 11110100B and 11100101B, respectively, as shown in (B) of FIG. 7. Similarly, the other left rotation pixels and the other right rotation pixels in the image block are rotated according to the additional information.

When the pixel value is represented by eight bits, it may be rotated by 0 through 7 bits, in which case, 0 through 7-bit additional information (represented by three bits) may be embedded into one image block.

The image block whose selected pixels have been rotated in step S3 is supplied to the coded-image memory 43 as a coded block and stored therein. Then, it is determined in step S4 whether there is any image block (hereinafter referred to as an "unprocessed block") in the bit rotation unit 42, and if so, one of the unprocessed image blocks is set to be a current block. The process then returns to step S2, and the corresponding processing is repeated.

If it is found in step S4 that there is no unprocessed block, i.e., that all the coded blocks for one frame are stored in the coded-image memory 43, the coded blocks are read from the coded-image memory 43. The process then proceeds to step S5 in which it is determined whether there are any more frames to be processed in the block dividing unit 41. If the outcome of step S5 is yes, the process returns to step S1, and the corresponding processing is repeated.

If it is determined in step S5 that there are no more frames to be processed by the block dividing unit 41, the embed-coding processing is completed.

As discussed above, some of the pixels forming the image are selected, and the values of the selected pixels are rotated according to the additional information, thereby embedding the additional information into the image. It is thus possible to embed the additional information with the minimum loss of the image quality and without increasing the amount of data.

The selected pixels embedded with the additional information (pixels indicated by the black portions ● and the hatched portions in (A) of FIG. 7) can be decoded (restored) into the original pixels and into the additional information by utilizing the correlation of the image, i.e., the correlation between the selected pixels and the pixels without the additional information (pixels indicated by ○ in (A) of FIG. 7) without an overhead, as discussed below. Accordingly, the degradation of the image quality which is conventionally caused by embedding the additional information is not observed in the resulting coded image (reproduced image).

Figure 8:
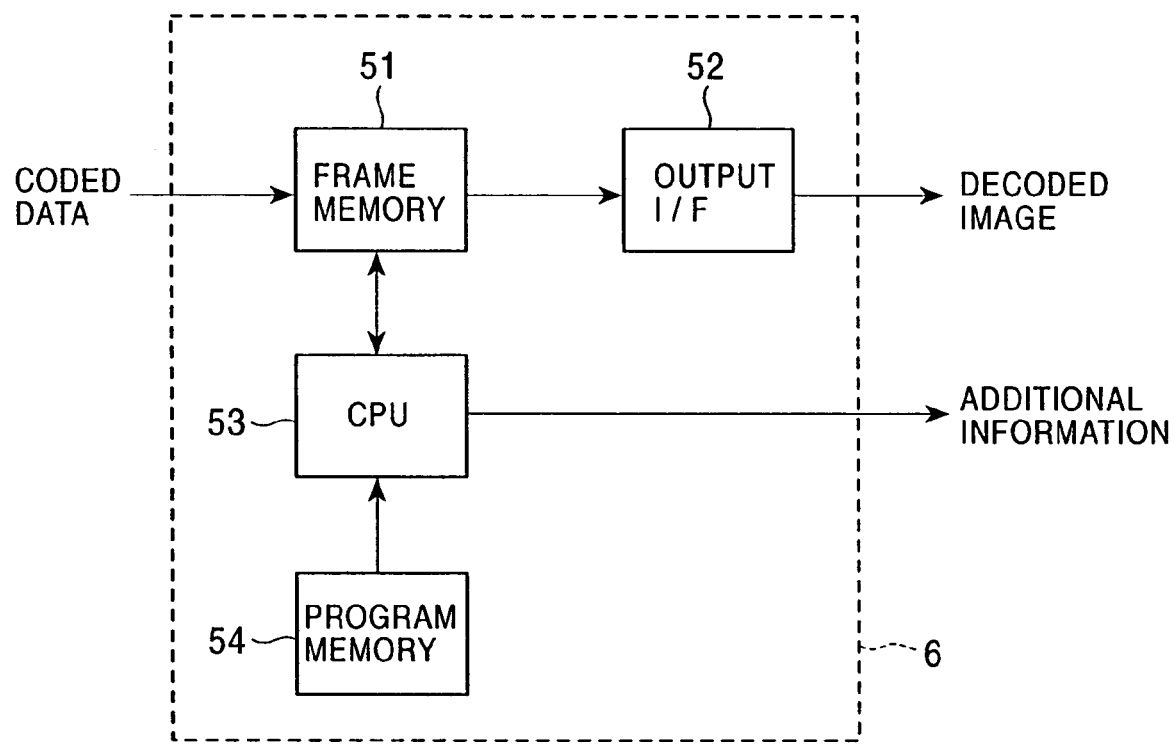
FIG. 8 is a block diagram illustrating an example of the hardware configuration of a decoder 6 shown in FIG. 1.

FIG. 8 illustrates an example of the configuration of the decoder 6 shown in FIG. 1 for decoding the coded data output from the embedding coder 3 shown in FIG. 5 into the original image and into the additional information by utilizing the correlation of the image.

The coded data, i.e., the image embedded with the additional information (hereinafter sometimes referred to as an "embedded image"), is supplied to a frame memory 51. The frame memory 51 temporarily stores embedded images, for example, in units of frames. The frame memory 51 is configured similarly to the frame memory 31 shown in FIG. 4, and by switching banks provided for the frame memory 51, embedded images can be processed in real time even if they are moving pictures.

An output interface (I/F) 52 reads an image (decoded image) from the frame memory 51 obtained by performing decoding processing by a CPU 53, which will be discussed below, and outputs the image.

The CPU 53 performs decoding processing by executing a program stored in a program memory 54. That is, the CPU 53 decodes the embedded image stored in the frame memory 51 into the original image and into the additional information by utilizing the correlation of the image.

The program memory 54 is configured similarly to the program memory 33 shown in FIG. 4, and stores the computer program for enabling the CPU 53 to perform decoding processing.

Figure 9:
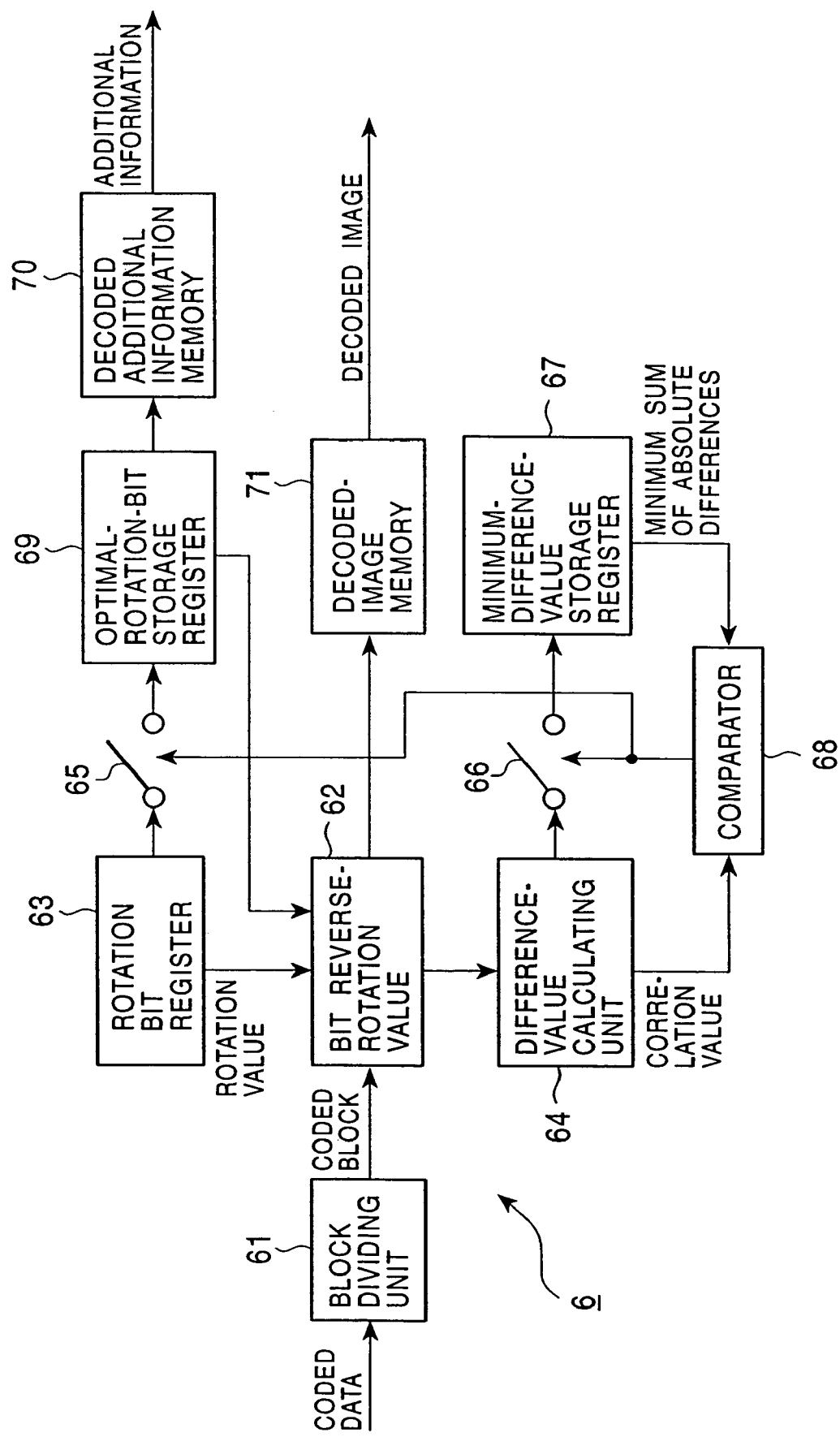
FIG. 9 is a block diagram illustrating the functional configuration of the decoder 6 shown in FIG. 8 according to the first embodiment of the present invention.

FIG. 9 illustrates an example of the functional configuration of the decoder 6 which can be implemented by executing the program stored in the program memory 54 by the CPU 53 shown in FIG. 8 according to the first embodiment of the present invention.

The embedded image as coded data is supplied to a block dividing unit 61, for example, in units of frames. As in the block dividing unit 41 shown in FIG. 5, the block dividing unit 61 divides the embedded image into blocks, each having a predetermined size, i.e., into coded blocks, and sequentially supplies them to a bit reverse-rotation unit 62.

Among the pixels forming each coded block supplied from the block dividing unit 61, the bit reverse-rotation unit 62 selects pixels located at the same positions as those selected by the bit rotation unit 42 shown in FIG. 5. The bit reverse-rotation unit 62 then rotates the values of the selected pixels by the number of bits corresponding to a rotation value supplied from a rotation bit register 63, and supplies the resulting value to a difference-value calculating unit 64. The bit reverse-rotation unit 62 also rotates the values of the selected pixels by the number of optimal rotation bits stored in an optimal-rotation-bit storage register 69. As a result, the coded block is decoded into the original image block, which is then supplied to a decoded-image memory 71.

The rotation bit register 63 sets the rotation value as the number of bits by which the pixel value is to be rotated, and supplies the set rotation value to the bit reverse-rotation unit 62 and to a switch 65. More specifically, when the pixel value is represented by th_r bits, it can be rotated by 0 through th_r-1 bits (rotation by a number equal to or greater than th_r bits obtains the same result as rotation by the corresponding number of 0 through th_r-1 bits). In this case, the rotation bit register 63 sequentially sets 0 through th_r-1 bits as the rotation values and supplies them to the bit reverse-rotation unit 62 and to the switch 65.

Upon receiving from the bit reverse-rotation unit 62 the coded block in which the values of the selected pixels have been rotated, the difference-value calculating unit 64 calculates a correlation value between each selected pixel and the adjacent pixel, for example, the sum of the absolute difference values (hereinafter referred to as the "sum of absolute differences"). The sum of absolute differences of the pixel values are supplied to a switch 66 and to a comparator 68.

The switch 65 receives the rotation value from the rotation bit register 63 and supplies it to the optimal-rotation-bit storage register 69 under the control of the comparator 68. The switch 66 receives the correlation value from the difference-value calculating unit 64 and supplies it to a minimum-difference-value storage register 67 under the control of the comparator 68.

The minimum-difference-value storage register 67 stores the correlation value supplied from the difference-value calculating unit 64 via the switch 66 as a maximum correlation value concerning the coded block which is currently being processed (hereinafter sometimes referred to as the "current coded block"). In this embodiment, as stated above, the sum of the absolute differences between the individual selected pixels and the adjacent pixels is used as the correlation value concerning the coded block. Accordingly, the maximum correlation value is the minimum sum of the absolute differences of the pixel values.

The minimum sum of the absolute differences stored in the minimum difference-value storage register 67 as the maximum correlation value is supplied to the comparator 68. The comparator 68 then compares the sum of the absolute differences output from the difference-value calculating unit 64 with the minimum sum of the absolute differences stored in the minimum difference-value storage register 67, and based on the comparison result, the comparator 68 controls the switches 65 and 66.

The optimal-rotation-bit storage register 69 receives the rotation value from the rotation bit register 63 via the switch 65, and stores it as an optimal rotation bit, which is an optimal number of bits by which the values of the selected pixels of the coded block are to be rotated. The optimal-rotation-bit storage register 69 suitably supplies the optimal rotation bit to the bit reverse-rotation unit 62 and to a decoded additional-information memory 70.

The decoded additional-information memory 70 temporarily stores the value corresponding to the optimal rotation bit supplied from the optimal-rotation-bit storage register 69 as the decoded additional information embedded in the coded block, and outputs it. The decoded-image memory 71 temporarily stores the coded block, output from the bit reverse-rotation unit 62, whose values of the selected pixels have been rotated by the optimal rotation bit, as the decoded image block. When decoded images for one frame are stored, the decoded-image memory 71 outputs them.

Figure 10:
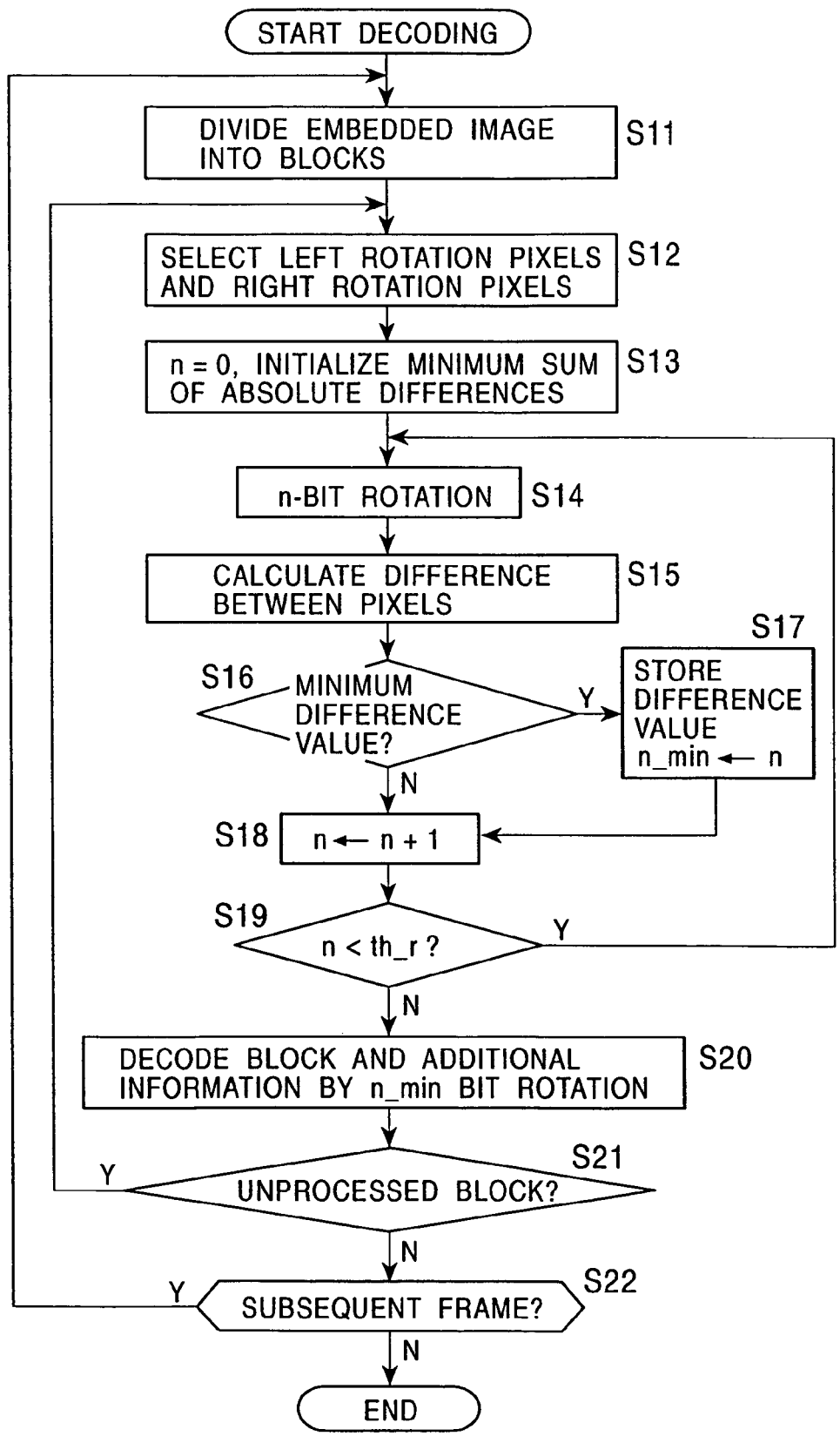
FIG. 10 is a flow chart illustrating decoding processing performed by the decoder 6 shown in FIG. 9.

Embed-decoding processing performed by the decoder 6 shown in FIG. 9 is described below with reference to the flow chart of FIG. 10.

As stated above, embedded images are supplied to the block dividing unit 61 in units of frames. Upon receiving the embedded images for one frame, in step S11, the block dividing unit 61 divides the embedded image into blocks, each having a predetermined size, as in the case of the block dividing unit 41 shown in FIG. 5. That is, the block dividing unit 61 divides, as shown in (A) of FIG. 11, the embedded image into 4×4-pixel coded blocks. The coded blocks divided by the block dividing unit 61 are sequentially supplied to the bit reverse-rotation unit 62 in, for example, raster scanning order.

Upon receiving the coded block from the block dividing unit 61, the bit reverse-rotation unit 62 sets the coded block to be the current coded block and selects some of the pixels forming the current coded block. More specifically, the bit reverse-rotation unit 62 selects the same pixels, indicated by the hatched portions and the black portions ● shown in FIG. 11, as those selected by the bit rotation unit 42 shown in FIG. 5. The bit reverse-rotation unit 62 also sets the pixels which have been determined as the left rotation pixels and the right rotation pixels by the bit rotation unit 42 shown in FIG. 5 as right rotation pixels and left rotation pixels, respectively.

That is, among the coded selected pixels, the pixels determined as the left rotation pixels by the bit rotation unit 42 are rotated to the right by the number of bits corresponding to the additional information embedded in the image. Similarly, the pixels determined as the right rotation pixels by the bit rotation unit 42 are rotated to the left by the number of bits corresponding to the additional information embedded in the coded pixels. As a result, the coded pixels can be decoded into the original pixels.

Figure 11:
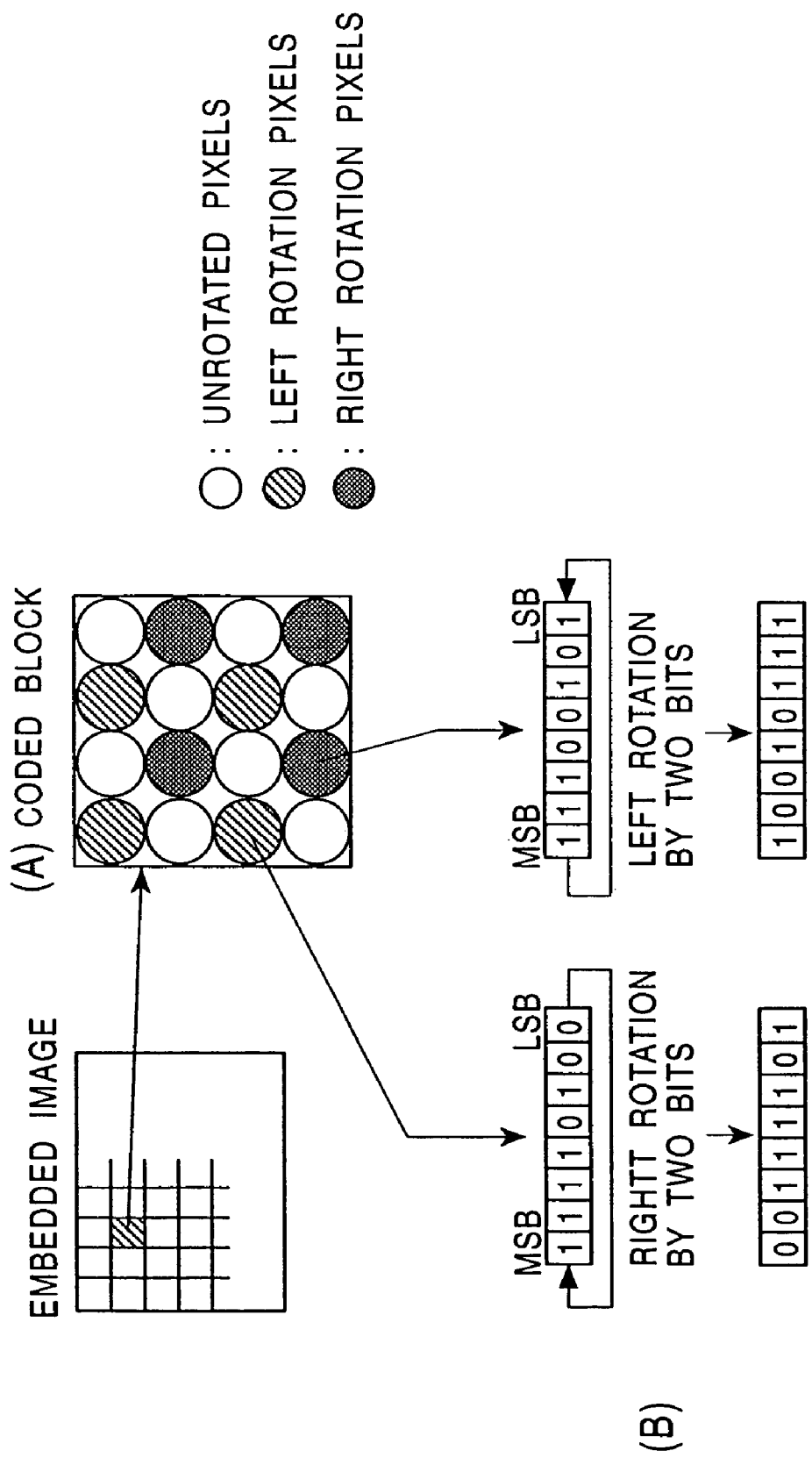
FIG. 11 illustrates pixels to be selected for each image block in performing the decoding processing shown in FIG. 10 and also illustrates the data decoding operation by reverse-rotating the selected pixels.

The bit reverse-rotation unit 62 therefore sets the pixels which have been determined as the left rotation pixels and as the right rotation pixels to be right rotation pixels and left rotation pixels, respectively. Accordingly, in contrast to the rotating operation discussed with reference to (A) of FIG. 7, in the bit reverse-rotation unit 62, the pixels indicated by the hatched portions shown in (A) of FIG. 11 are determined to be right rotation pixels, while the pixels indicated by the black portions ● shown in (A) of FIG. 11 are determined to be left rotation pixels.

The process then proceeds to step S13. In step S13, the rotation bit register 63 initializes the rotation value n to be 0, and the minimum difference-value storage register 67 initializes the value (minimum sum of absolute differences) to be a predetermined large value (for example, the maximum value which can be stored). Subsequently, the rotation bit register 63 supplies the rotation value n to the bit reverse-rotation unit 62 and also outputs it to the switch 65, which is normally turned off, and the process proceeds to step S14.

In step S14, the bit reverse-rotation unit 62 rotates the values of the left rotation pixels and the values of the right rotation pixels of the current coded block to the left and to the right, respectively, by the rotation value n supplied from the rotation bit register 63, and supplies the resulting current coded block to the difference-value calculating unit 64.

It is now assumed that the pixel value is represented by eight bits, and that the value of a right rotation pixel is 11110100B and the value of a left rotation pixel is 11100101B. It is also assumed that the rotation value n is "2". The right rotation pixel 11110100B is rotated to the right by two bits, while the left rotation pixel 11100101B is rotated to the left by two bits, resulting in 00111101B and 10010111B, respectively, as shown in (B) of FIG. 11. Likewise, the other left rotation pixels and the other right rotation pixels in the current coded block are rotated to the left and to the right, respectively, according to the rotation value n.

Upon receiving the current coded block having the pixel values rotated by n bits from the bit reverse-rotation unit 62, in step S15, the difference-value calculating unit 64 calculates the sum of the individual selected pixels and the adjacent pixels, i.e., in this case, the sum of the absolute differences between the selected pixels and the adjacent pixels, as the correlation value of the current coded block (correlation value of the pixels forming the current coded block).

Figure 12:
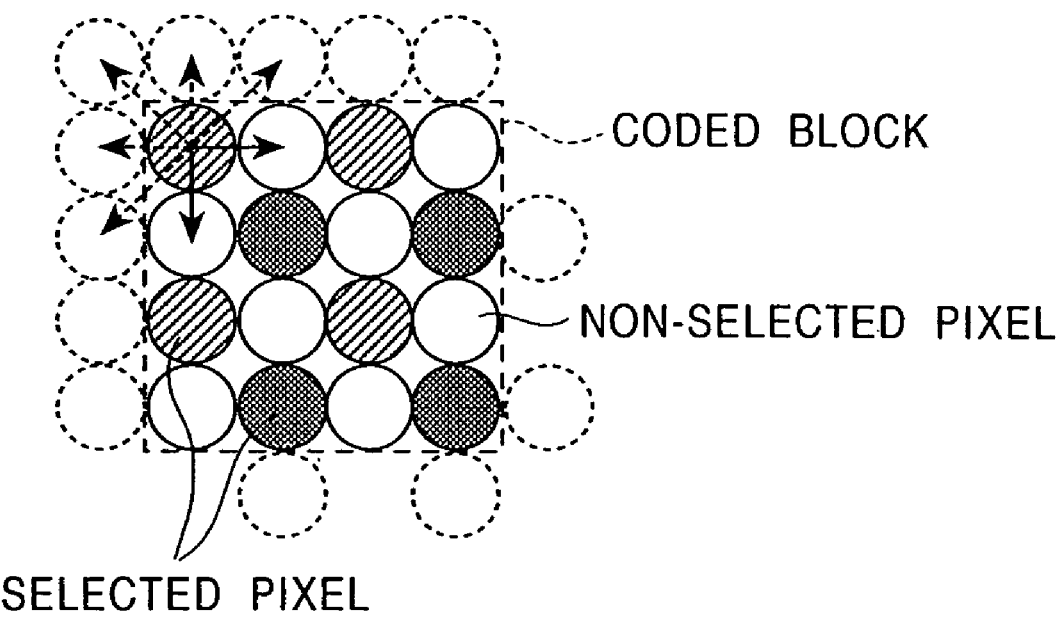
FIG. 12 illustrates the calculating processing of differences between pixels performed in step S15 shown in FIG. 10.

More specifically, in the coded block, as illustrated in FIG. 12, the selected pixels indicated by the black portions ● and the hatched portions are located adjacent to at least one pixel which has not been rotated during the embed-coding processing (hereinafter sometimes referred to as a "non-selected pixel"). In the difference-value calculating unit 64, the absolute difference between each selected pixel and the adjacent non-selected pixel is calculated, and the sum of such absolute differences is determined to be the correlation value of the current coded block.

If a selected pixel is located adjacent to a plurality of non-selected pixels, such as the case shown in FIG. 12, the absolute difference between the selected pixel and each of the non-selected pixels is calculated, as indicated by the solid arrows shown in FIG. 12.

In the example discussed above, the correlation value is obtained by using only the pixels within the current coded block. However, the correlation value may be determined by using pixels of a block other than the current coded block.

For example, if coded blocks forming an embedded image are processed as the current coded blocks in raster scanning order, coded blocks adjacent to a current coded block to the left, to the top, and to the top left have already been decoded into the original pixel values. Some pixels adjacent to the current coded block to the left, to the top, to the right, or to the bottom have not been rotated during embed-coding processing (non-selected pixels).

Among the pixels outside the current coded block, the pixels which remain the same before and after embed-coding processing (indicated by the dotted circles shown in FIG. 12) may be used for calculating absolute differences with the selected pixels of the current coded block, as indicated by the dotted arrows in FIG. 12.

Additionally, in the example described above, the absolute difference between the selected pixel and each of the adjacent non-selected pixels is employed for determining the correlation value of the coded block. However, the absolute difference between the selected pixel and non-selected pixels which are not adjacent but which surround the selected pixel may be used.

Alternatively, not only pixels spatially adjacent to the selected pixel, but also pixels temporally adjacent to the selected pixel, may be used.

In this manner, the sum of the absolute differences calculated in the difference-value calculating unit 64 as the correlation value of the current coded block is supplied to the comparator 68 and also to the switch 66, which is normally turned off.

Upon receiving the sum of the absolute differences of the current coded block, the comparator 68 determines in step S16 whether the sum of the absolute differences is smaller than the value (minimum sum of the absolute differences) stored in the minimum difference-value storage register 67.

If the outcome of step S16 is yes, it is found that the correlation value of the current coded block whose selected pixels have been rotated by n bits is greater than the previously obtained correlation value. It is thus determined that the current coded block whose selected pixels have been rotated by n bits has most probably been decoded into the original image block. The process then proceeds to step S17 in which the comparator 68 temporarily changes the switches 65 and 66 from off to on, and the process proceeds to step S18.

By temporarily turning the switches 65 and 66 on, in step S17, the rotation value n output from the rotation bit register 63 is supplied to the optimal-rotation-bit storage register 69 via the switch 65. In the optimal-rotation-bit storage register 69, the value stored as the optimal rotation bit n_min is overwritten by the rotation value n from the rotation bit register 63 as a new optimal rotation bit n_min (optimal number of bits by which the selected pixels are to be rotated in order to decode the current coded block).

In step S17, the sum of the absolute differences is supplied from the difference-value calculating unit 64 to the minimum difference-value storage register 67 via the switch 66. In the minimum difference-value storage register 67, the value stored therein is overwritten by the sum of the absolute differences output from the difference-value calculating unit 64 as a new minimum sum of the absolute differences (as the maximum correlation value concerning the current coded block).

If it is determined in step S16 that the sum of the absolute differences output from the difference-value calculating unit 64 is not smaller than the value stored in the minimum difference-value storage register 67, in other words, if it is determined that the correlation value concerning the current coded block whose selected pixel values have been rotated by n bits is not greater than the previously obtained maximum correlation value, it can be determined that the current coded block has not been decoded into the original block. Then, the process proceeds to step S18 by skipping step S17. In step S18, the rotation value n is incremented by one in the rotation bit register 63.

A determination is then made in step S19 whether the rotation value n in the rotation bit register 63 is smaller than the number of bits of the pixel value th_r. If the result of step S19 is yes, i.e., if the rotation value n is within the number of bits by which the pixel value can be rotated, the process returns to step S14, and the corresponding processing is repeated.

Conversely, if it is found in step S19 that the rotation value n is not smaller than the number of bits of the pixel value th_r, i.e., if the correlation value (sum of the absolute differences) concerning the current coded block has been calculated by using all the possible rotation values n by which the pixel value can be rotated, the process proceeds to step S20. In step S20, the values of the selected pixels of the current coded block are rotated by the optimal rotation bit n_min, thereby decoding the current coded block into the original block and decoding the additional information embedded in the coded block.

More specifically, the optimal-rotation-bit storage register 69 supplies the optimal rotation bit n_min stored therein to the bit reverse-rotation unit 62. The bit reverse-rotation unit 62 rotates the left rotation pixels and the right rotation pixels of the current coded block to the left and to the right, respectively, as discussed in step S14, by the optimal rotation bit n_min, thereby decoding the current coded block into the original block. The decoded block is then supplied to the decoded-image memory 71 and is stored in a corresponding address.

The optimal-rotation-bit storage register 69 also supplies the optimal rotation bit n_min stored therein to the decoded additional-information memory 70 as the decoded additional information embedded in the current coded block.

Thereafter, it is determined in step S21 whether there are any more blocks to be processed (hereinafter sometimes referred to as an "unprocessed block") in the bit reverse-rotation unit 62 as the current coded block. If the outcome of step S21 is yes, one of the unprocessed blocks (for example, the subsequent coded block in raster scanning order) is determined to be the current coded block. The process then returns to step S12, and the corresponding processing is repeated.

If it is found in step S21 that there are no more unprocessed blocks, in other words, if all the decoded blocks for one frame are stored in the decoded-image memory 71 and all the items of the decoded additional information embedded in the one-frame blocks are stored in the decoded additional-information memory 70, the decoded images for one frame are read from the decoded-image memory 71, and also, the decoded additional information is read from the decoded additional-information memory 70.

Subsequently, it is determined in step S22 whether there are any more embedded image frames to be subsequently processed in the block dividing unit 61. If the result of step S22 is yes, the process returns to step S11, and the corresponding processing is repeated.

On the other hand, if it is found in step S22 that there are no more embedded image frames to be subsequently processed in the block dividing unit 61, the decoding processing is completed.

According to the foregoing description, the coded image data embedded with additional information is decoded into the original image and into the additional information by utilizing the correlation of the image. Thus, the decoding operation can be performed without incurring an overhead required for performing the decoding operation. Consequently, the decoded image (reproduced image) is basically free from the degradation of the image quality which is conventionally suffered by embedding the additional information.

A simulation test was conducted as follows. A natural image, each pixel having eight bits, was divided into 4×4-pixel blocks, and the embed-coding operation was performed (in this case, since three-bit additional information can be embedded into one block, the embedding rate of additional information is 3 bits/16 pixels). Then, the decoding operation was performed on the embedded image, and all the pixel values were correctly decoded (which means that the additional information was also correctly decoded).

Another simulation test was conducted as follows. A natural image similar to that used in the above-described simulation test was divided into 2×2-pixel blocks, and the embed-coding operation was performed (in this case, the embedding rate of additional information is 3 bits/4 pixels, which is four times as high as that of the above-described simulation test). Then, the decoding operation was performed on the embedded image, and 97.92% of the pixel values were correctly decoded.

Accordingly, if one block is formed of a greater number of pixels, the pixels can be decoded with higher precision. On the other hand, the amount of additional information which can be embedded into one frame, i.e., the embedding rate, is decreased. In contrast, if one block is formed of a smaller number of pixels, the embedding rate is increased, but the decoding precision is lowered. Thus, the number of pixels forming one block is desirably determined in view of the tradeoffs of the embedding rate and the decoding precision.

In the foregoing embodiment, if a pixel value is represented by a plurality of components, such as YUV or RGB, all the components may be rotated according to the same additional information. Alternatively, the components may be individually rotated according to different items of additional information.

In the aforementioned embodiment, some of the pixels forming the block are selected according to a checkerboard pattern, and the additional information is embedded into the selected pixels. However, some of the pixels used for embedding the additional information may be selected according to a different pattern. Additionally, although in this embodiment one half the pixels forming the block are selected, and the values of the selected pixels are rotated according to the additional information, the number of pixels used for performing rotation is not restricted to one half the pixels forming the block. As stated above, however, in decoding the pixels embedded with additional information, the correlation value may be desirably determined by using the pixels without the additional information. The correlation between pixels becomes smaller as the pixels are spatially or temporally farther from each other. Therefore, in order to perform the correct decoding operation, the pixels into which additional information is to be embedded may be selected in such a manner that they are sparsely located spatially or temporally.

In the foregoing embodiment, the left rotation pixels and the right rotation pixels are selected so that they are alternately located in the diagonal direction of the selected pixels. However, the left rotation pixels and the right rotation pixels may be arranged according to a different pattern.

In the aforementioned embodiment, some of the selected pixels are determined to be the left rotation pixels and are thus rotated to the left according to the additional information, while the remaining selected pixels are determined to be the right rotation pixels and are thus rotated to the right according to the additional information. However, all the selected pixels may be rotated to the left or to the right.

Figure 13:
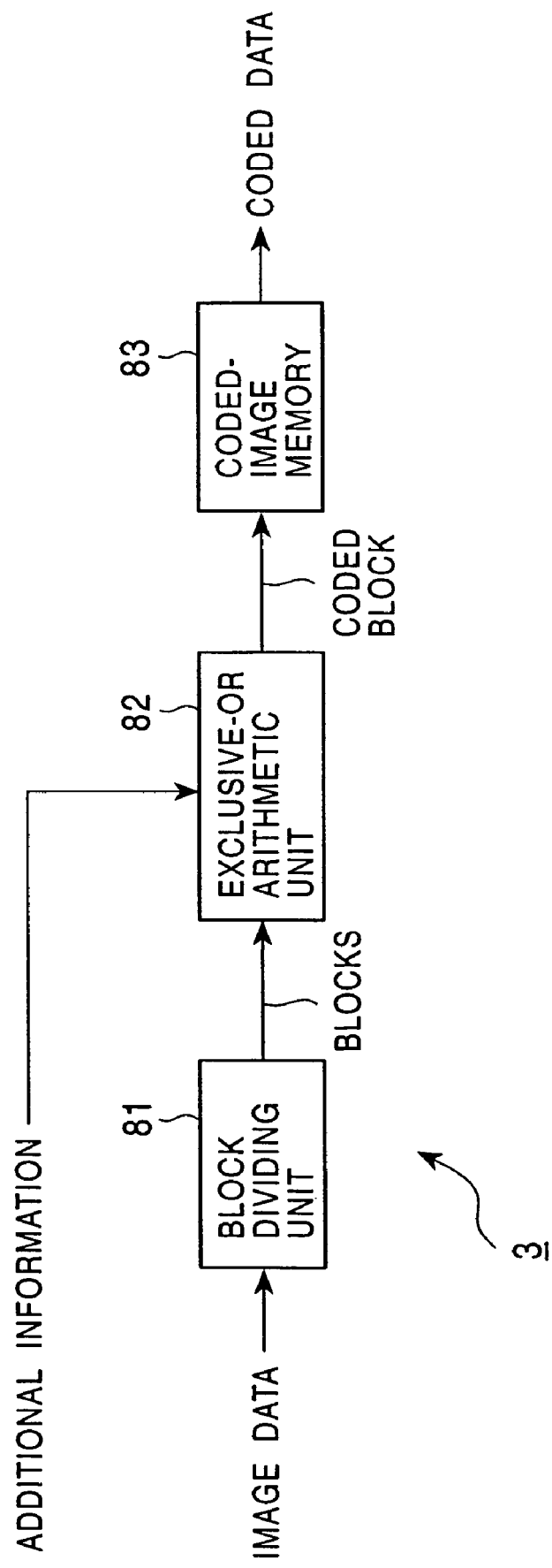
FIG. 13 is a block diagram illustrating the functional configuration of the embedding coder 3 shown in FIG. 4 according to a second embodiment of the present invention.

FIG. 13 illustrates an example of the configuration of the embedding coder 3 which can be implemented by executing the program stored in the program memory 33 by the CPU 32 shown in FIG. 4 according to a second embodiment of the present invention.

Images to be coded are supplied to a block dividing unit 81, for example, in units of frames. The block dividing unit 81 then divides the images for one frame into image blocks, each having a predetermined size, and supplies the divided blocks to an exclusive-OR arithmetic unit 82.

Not only the image blocks from the block dividing unit 81, but also additional information to be embedded into images, is supplied to the exclusive-OR arithmetic unit 82. The exclusive-OR arithmetic unit 82 selects some of the pixels forming the image block (hereinafter sometimes referred to as "selected pixels") supplied from the block dividing unit 81, and computes an exclusive-OR between each of the selected pixels and the additional information, thereby embedding the additional information into the selected pixels. The image block having the additional information embedded into the selected pixels is supplied to a coded-image memory 83 as a coded block.

The coded-image memory 83 sequentially stores the coded blocks supplied from the exclusive-OR arithmetic unit 82. When coded blocks for one frame are stored, the coded blocks are output as coded data.

Figure 14:
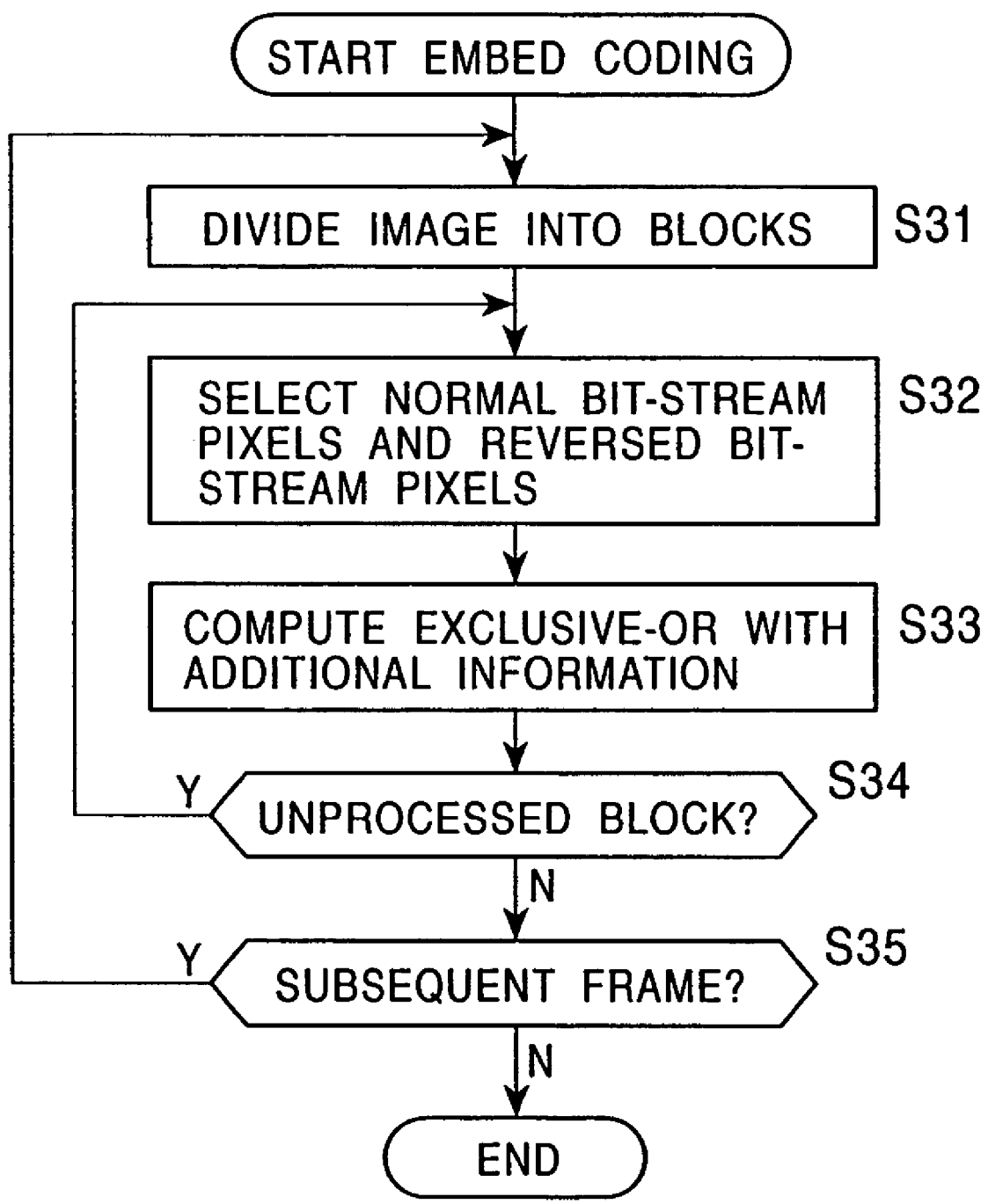
FIG. 14 is a flow chart illustrating embed-coding processing performed by the embedding coder 3 shown in FIG. 13.

A description is now given, with reference to the flow chart of FIG. 14, of the embed-coding processing performed by the embedding coder 3 shown in FIG. 13.

As stated above, images to be coded are supplied to the block dividing unit 81 in units of frames. Upon receiving an image for one frame, in step S31, the block dividing unit 81 divides the image into blocks, each having a predetermined size. That is, the block dividing unit 81 divides the image, as shown in (A) of FIG. 15, into 4×4-pixel image blocks. The image blocks obtained by the block dividing unit 81 are sequentially supplied to the exclusive-OR arithmetic unit 82, for example, in raster scanning order.

Upon receiving the image block from the block dividing unit 81, in step S32, the exclusive-OR arithmetic unit 82 sets the received image block to be the current block and selects some of the pixels forming the current block. More specifically, the exclusive-OR arithmetic unit 82 selects the pixels indicated by the black portions ● and the hatched portions shown in (A) of FIG. 15 according to a checkerboard pattern. That is, one half the pixels forming the current block are selected.

Then, in step S33, the exclusive-OR arithmetic unit 82 computes an exclusive-OR between each of the selected pixels and the additional information, thereby embedding the additional information into the selected pixels. More specifically, the exclusive-OR arithmetic unit 82 computes an exclusive-OR between each of the selected pixels indicated by the hatched portions in (A) of FIG. 15 and the bit stream of the additional information, and sets the computed result to be the value of the selected pixel.

The exclusive-OR arithmetic unit 82 also computes an exclusive-OR between each of the selected pixels indicated by the black portions ● and the bit stream obtained by reversing the order of the bit stream of the additional information (hereinafter referred to as the "reversed bit stream"), and sets the computed result to be the value of the selected pixel.

The pixels used for computing an exclusive-OR with the bit stream of the additional information and with the reversed bit stream of the additional information are hereinafter referred to as "normal bit-stream pixels" and "reversed bit-stream pixels", respectively. In the second embodiment, the normal bit-stream pixels and the reversed bit-stream pixels are alternately arranged in the diagonal direction of the selected pixels, as illustrated in (A) of FIG. 15. Accordingly, one half the selected pixels are set to be the normal bit-stream pixels and the other half are set to be the reversed bit-stream pixels.

It is now assumed that the pixel value is represented by eight bits, and that the value of a normal bit-stream pixel is 00111101B (B represents that the preceding number is binary) and the value of a reversed bit-stream pixel is 10010111B. It is also assumed that the additional information is 00101001B (=41). Then, an exclusive-OR is computed, as shown in (B) of FIG. 15, between the value of the normal bit-stream pixel 00111101B and the bit stream 00101001B representing the additional information, resulting in 00010100B. An exclusive-OR is also computed, as shown in (C) of FIG. 15, between the value of the reversed bit-stream pixel 10010111B and the reversed bit stream 10010100B of the additional information, resulting in 00000011B. Similarly, an exclusive-OR is computed for the other normal bit-stream pixels and the reversed bit-stream pixels.

When the pixel value is represented by eight bits, exclusive-OR computation can be performed between the pixel value and the additional information having the same number of bits. Accordingly, in this case, 8-bit additional information (ranging from 0 to 255) can be embedded into one block.

In step S33, after computing an exclusive-OR between the selected pixels and the additional information as described above, the resulting block is supplied to the coded-image memory 83 as a coded block and is stored therein. The process then proceeds to step S34.

A determination is made in step S34 whether there are any more blocks to be processed (hereinafter sometimes referred to be "unprocessed blocks") in the exclusive-OR arithmetic unit 82 as the current block. If the outcome of step S34 is yes, one of the unprocessed blocks is set to be the current block, and the process returns to step S32, and the corresponding processing is repeated.

If it is determined in step S34 by the exclusive-OR arithmetic unit 82 that there are no more unprocessed blocks, in other words, if all the coded blocks for one frame are stored in the coded-image memory 83, the coded blocks are read from the coded-image memory 83.

It is then determined in step S35 whether there are any more frames to be processed in the block dividing unit 81. If the result of step S35 is yes, the process returns to step S31, and the corresponding frame is processed in a manner similar to the above.

If it is found in step S35 that there are no more frames to be processed in the block dividing unit 81, the embed-coding processing is completed.

In this manner, the additional information is embedded into the image block by selecting some of the pixels forming the image block and by computing an exclusive-OR between each of the selected pixels and the additional information. It is thus possible to embed the additional information into the image with the minimum loss of the image quality and without increasing the amount of data.

Figure 15:
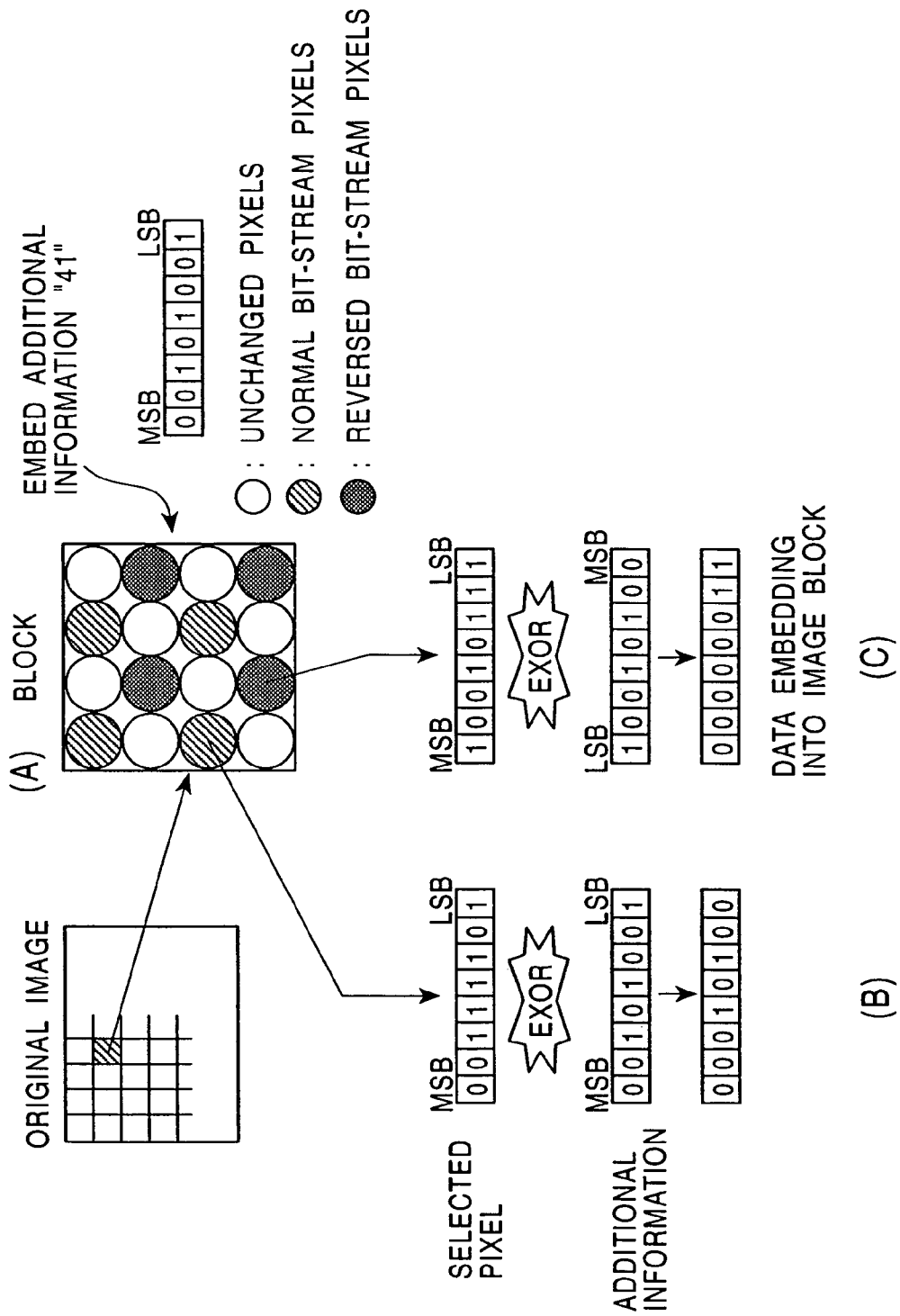
FIG. 15 illustrates pixels to be selected for each image block in performing the embed-coding processing shown in FIG. 14 and also illustrates the data embedding operation by computing an exclusive-OR between one of the selected pixels and additional information and by computing an exclusive-OR between one of the selected pixels and the reversed additional information.

That is, among the selected pixels embedded with the additional information shown in (A) of FIG. 15, the pixel values, indicated by the hatched portions and the black portions ●, can be decoded (restored) into the original pixels and into the additional information by utilizing the correlation of the image, i.e., the correlation between the selected pixels and the pixels without the additional information, which are indicated by ○ in (A) of FIG. 15, without incurring an overhead. This is discussed in detail below. Accordingly, the degradation of the image quality caused by embedding the additional information is not observed in the decoded image (reproduced image).

Figure 16:
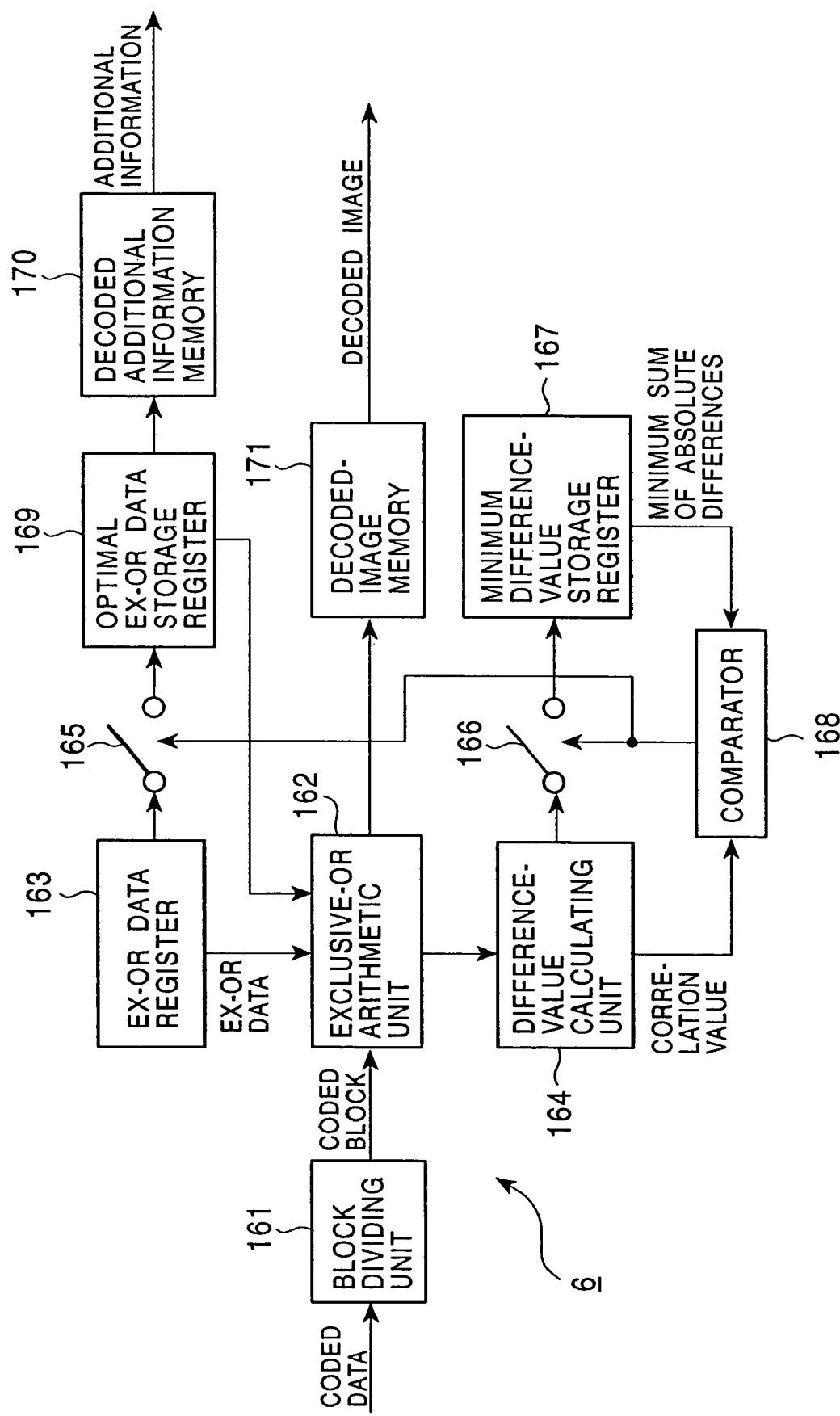
FIG. 16 is a block diagram illustrating the functional configuration of the decoder 6 shown in FIG. 8 according to the second embodiment of the present invention.

FIG. 16 illustrates an example of the configuration of the decoder 6 which can be implemented by executing the program stored in the program memory 54 by the CPU 53 shown in FIG. 8 according to the second embodiment of the present invention.

Embedded images as coded data are supplied to a block dividing unit 161, for example, in units of frames. The block dividing unit 161 divides the embedded image into blocks, each having a predetermined size, i.e., into coded blocks, and sequentially supplies the divided blocks to an exclusive-OR arithmetic unit 162, as in the case of the block dividing unit 81 shown in FIG. 13.

Among the pixels forming the coded block supplied from the block dividing unit 161, the exclusive-OR arithmetic unit 162 selects the pixels located at the same positions as those selected by the exclusive-OR arithmetic unit 82 shown in FIG. 13. Then, the exclusive-OR arithmetic unit 162 computes an exclusive-OR between each of the selected pixel values and EX-OR data supplied from an EX-OR data register 163, and supplies it to a difference-value calculating unit 164. The exclusive-OR arithmetic unit 162 also computes an exclusive-OR between each of the selected pixel values and optimal EX-OR data stored in an optimal EX-OR data storage register 169. As a result, the coded block can be decoded into the original image block and supplied to a decoded-image memory 171.

The EX-OR data register 163 sets the EX-OR data, which is the data used for computing an exclusive-OR with the pixel value, and supplies it to the exclusive-OR arithmetic unit 162 and to a switch 165. If the pixel value is represented by th_r bits, an exclusive-OR can be calculated between the pixel value and the data having th_r bits. In this case, the EX-OR data register 163 sequentially sets the data which can be represented by th_r bits, i.e., the value ranging from 0 through $2^{th\_r}-1$, as the EX-OR data, and supplies it to the exclusive-OR arithmetic unit 162 and to the switch 165.

The difference-value calculating unit 164 receives from the exclusive-OR arithmetic unit 162 the coded block in which an exclusive-OR has been computed between each of the selected pixel values and the EX-OR data, and computes the correlation value between the selected pixels and the adjacent pixels, i.e., in this case, the sum of absolute differences of the individual pixel values. The sum of the absolute differences as the correlation value is supplied to a comparator 168.

The switch 165 supplies the EX-OR data from the EX-OR data register 163 to the optimal EX-OR data storage register 169 under the control of the comparator 168. A switch 166 supplies the correlation value from the difference-value calculating unit 164 to a minimum difference-value storage register 167 under the control of the comparator 168.

The minimum difference-value storage register 167 stores via the switch 166 the correlation value supplied from the difference-value calculating unit 164 as the maximum correlation value concerning the currently processed coded block (hereinafter sometimes referred to as the "current coded block"). As discussed above, in the second embodiment, the sum of the absolute differences between the selected pixels and the adjacent pixels is used as the correlation value therebetween. Accordingly, the maximum correlation value means the minimum sum of the absolute differences of the pixel values.

The minimum sum of the absolute differences stored in the minimum difference-value storage register 167 as the maximum correlation is supplied to the comparator 168. The comparator 168 compares the sum of the absolute differences output from the difference-value calculating unit 164 with the minimum sum of the absolute differences stored in the minimum difference-value storage register 167, and based on the comparison result, the comparator 168 controls the switches 165 and 166.

The optimal EX-OR data storage register 169 receives the EX-OR data from the EX-OR data register 163 via the switch 165, and stores it as the optimal EX-OR data, which is the optimal bit stream used for computing an exclusive-OR with the selected pixel values of the coded block. Then, the optimal EX-OR data storage register 169 suitably supplies the optimal EX-OR data to the exclusive-OR arithmetic unit 162 and to the decoded additional-information memory 170.

The decoded additional-information memory 170 temporarily stores the optimal EX-OR data supplied from the optimal EX-OR data storage register 169 as the decoded additional information embedded in the coded block, and outputs it. The decoded-image memory 171 temporarily stores the coded block in which an exclusive-OR has been computed between the selected pixel values and the optimal EX-OR data as the decoded original image block, and when decoded image blocks for one frame are stored, the decoded images are output.

Figure 17:
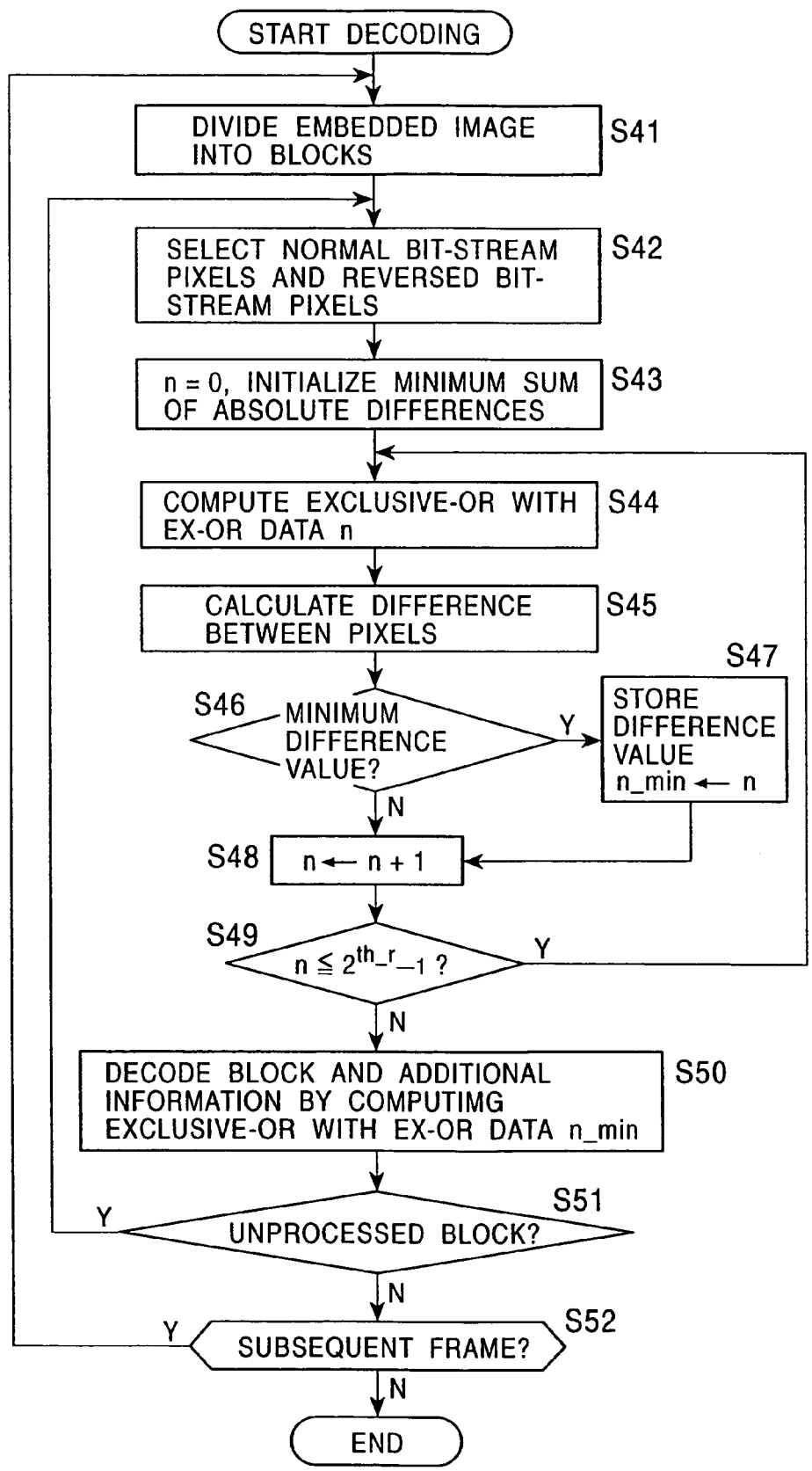
FIG. 17 is a flow chart illustrating decoding processing performed by the decoder 6 shown in FIG. 16.

The decoding processing performed by the decoder 6 shown in FIG. 16 is discussed below with reference to the flow chart of FIG. 17.

As stated above, embedded images are supplied to the block dividing unit 161 in units of frames. Upon receiving embedded images for one frame, in step S41, the block dividing unit 161 divides the embedded image into blocks, each having a predetermined size, as in the case of the block dividing unit 81 shown in FIG. 13. More specifically, the block dividing unit 161 divides, as shown in (A) of FIG. 18, into 4×4-pixel coded blocks. The coded blocks divided by the block dividing unit 161 are sequentially supplied to the exclusive-OR arithmetic unit 162, for example, in raster scanning order.

Upon receiving the coded block from the block dividing unit 161, in step S42, the exclusive-OR arithmetic unit 162 sets the received coded block as the current coded block, and selects some of the pixels forming the current coded block. More specifically, the exclusive-OR arithmetic unit 162 selects the same pixels, indicated by the hatched portions and the black portions ● shown in (A) of FIG. 18, as those selected by the exclusive-OR arithmetic unit 82 shown in FIG. 13. The exclusive-OR arithmetic unit 162 also selects the normal bit-stream pixels and the reversed bit-stream pixels from the above-mentioned selected pixels, as in the case of the exclusive-OR arithmetic unit 82.

That is, among the selected pixels of the coded block, the pixels determined to be the normal bit-stream pixels by the exclusive-OR arithmetic unit 82 shown in FIG. 13 can be decoded into the original pixels by computing an exclusive-OR between each of the pixel values and the bit stream corresponding to the additional information embedded in the coded pixels. Likewise, the pixels determined to be the reversed bit-stream pixels by the exclusive-OR arithmetic unit 82 can be decoded into the original pixels by computing an exclusive-OR between each of the pixel values and the reversed bit stream of the additional information embedded in the coded pixels.

Figure 18:
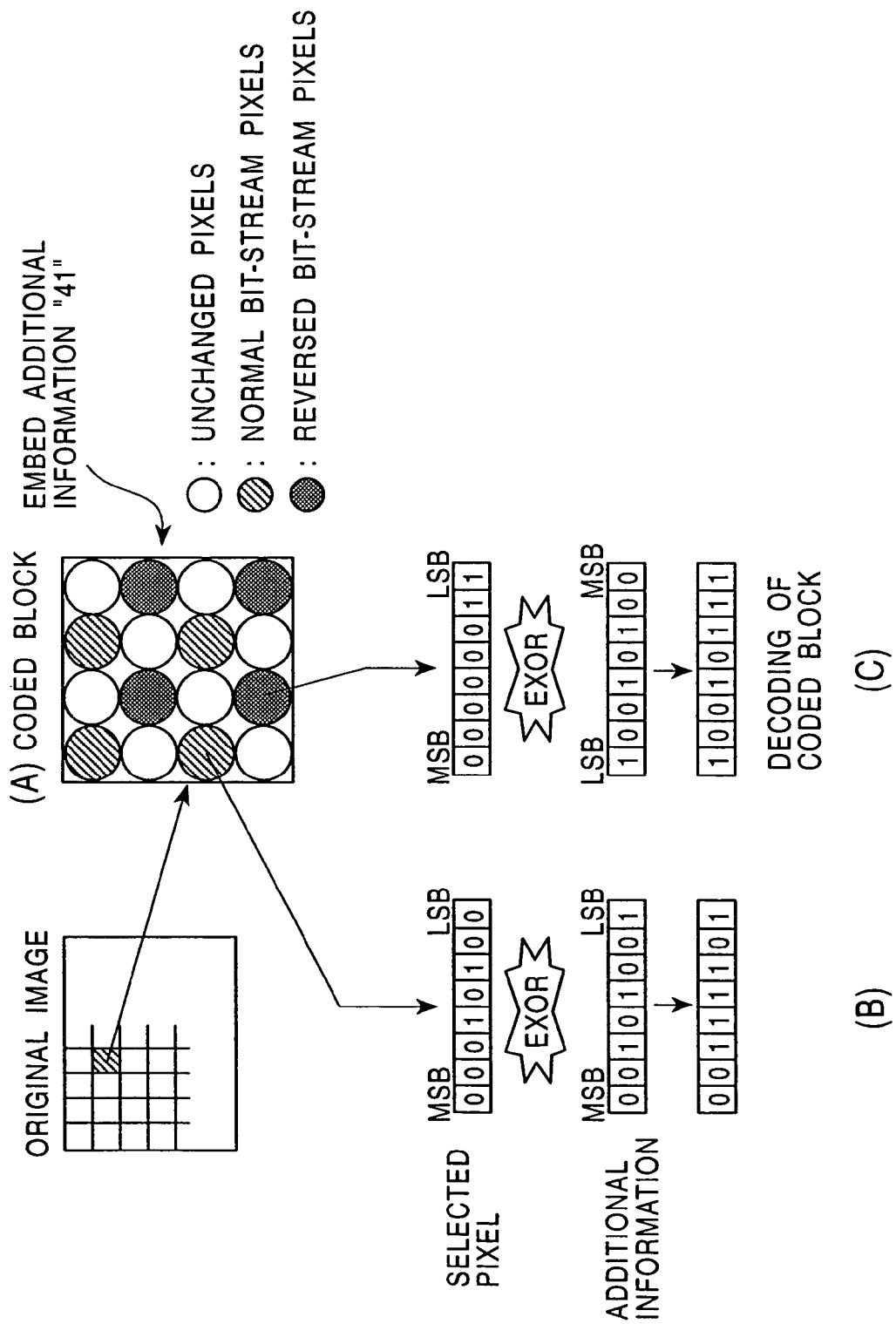
FIG. 18 illustrates pixels to be selected for each image block in performing the decoding processing shown in FIG. 17 and also illustrates the data decoding operation by computing an exclusive-OR between one of the selected pixels and additional information and by computing an exclusive-OR between one of the selected pixels and the reversed additional information.

Accordingly, the exclusive-OR arithmetic unit 162 selects the normal bit-stream pixels and the reversed bit-stream pixels from the selected pixels, as in the case of the exclusive-OR arithmetic unit 82. Thus, in the exclusive-OR arithmetic unit 162, the pixels indicated by the hatched portions in (A) of FIG. 18 are set to be normal bit-stream pixels, while the pixels indicated by the black portions ● are set to be reversed bit-stream pixels, in a manner similar to the example discussed with reference to (A) of FIG. 15.

Subsequently, the process proceeds to step S43. In step S43, the EX-OR data register 163 initializes the EX-OR data n to be 0, and the minimum difference-value storage register 167 initializes the value (minimum sum of the absolute differences) to be a predetermined large value (for example, the maximum value which can be stored). The EX-OR data register 163 then supplies the EX-OR data n to the exclusive-OR arithmetic unit 162 and to the switch 165, which is normally turned off, and the process proceeds to step S44.

In step S44, the exclusive-OR arithmetic unit 162 computes an exclusive-OR between the EX-OR data n output from the EX-OR data register 163 and each of the normal bit-stream pixels and the reversed bit-stream pixels of the current coded block, and supplies the computed result to the difference-value calculating unit 164.

It is now assumed that the pixel value is represented by eight bits, and that the value of a normal bit-stream pixel is 00010100B and the value of a reversed bit-stream pixel is 00000011B. It is also assumed that the EX-OR data n is 00101001B (=41). Then, an exclusive-OR is computed, as shown in (B) of FIG. 18, between the normal bit-stream pixel value 00010100B and the bit stream 00101001B representing the EX-OR data n, thus resulting in 00111101B. An exclusive-OR is also computed, as shown in (C) of FIG. 18, between the reversed bit-stream pixel value 00000011B and the bit stream 10010100B, which is the reversed bit stream of the EX-OR data n, thus resulting in 10010111B.

Upon receiving from the exclusive-OR arithmetic unit 162 the current coded block in which an exclusive-OR has been computed between the selected pixels and the EX-OR data n, in step S45, the difference-value calculating unit 164 calculates the sum of the correlation values between the selected pixels and the adjacent pixels, i.e., in this case, the sum of the absolute differences between the selected pixels and the adjacent pixels, as the correlation value concerning the current coded block (the correlation value between the pixels forming the current coded block).

Figure 19:
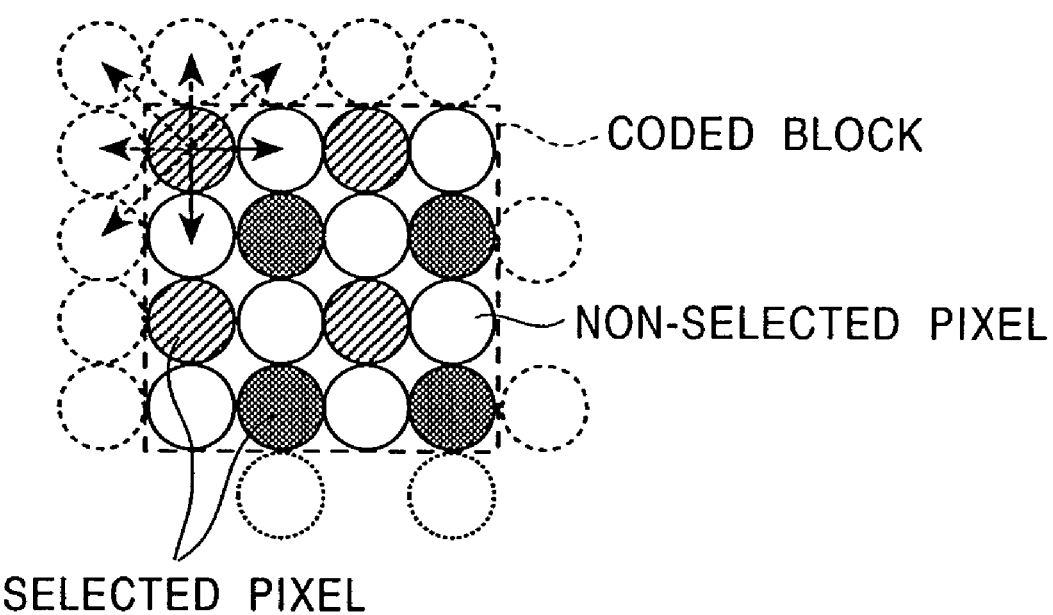
FIG. 19 illustrates the calculating processing of differences between pixels performed in step S45 shown in FIG. 17.

More specifically, in the coded block, as illustrated in FIG. 19, the selected pixels indicated by the hatched portions and the black portions ● are located adjacent to at least one pixel in which an exclusive-OR has not been computed with the additional information (hereinafter sometimes referred to as a "non-selected pixel"). The difference-value calculating unit 164 calculates the absolute difference between the selected pixels and the adjacent non-selected pixels, and determines the sum of the absolute differences as the correlation value of the coded block.

If the selected pixel is adjacent to a plurality of non-selected pixels, the absolute difference between the selected pixel and each of the non-selected pixels is calculated, as indicated by the solid arrows of FIG. 19.

In the example discussed above, the correlation value is obtained by using only the pixels within the current coded block. However, the correlation value may be determined by using pixels of a block other than the current coded block.

For example, if coded blocks forming an embedded image are processed as the current coded blocks in raster scanning order, coded blocks adjacent to a current coded block to the left, to the top, and to the top left have already been decoded into the original pixel values. An exclusive-OR has not been computed between some pixels adjacent to the current coded block to the left, to the top, to the right, or to the bottom and the additional information during embed-coding processing.

Among the pixels outside the current coded block, the pixels which remain the same before and after embed-coding processing (indicated by the dotted circles shown in FIG. 19) may be used for calculating absolute differences with the selected pixels of the current coded block, as indicated by the dotted arrows in FIG. 19.

Additionally, in the example described above, the absolute difference between the selected pixel and each of the adjacent non-selected pixels is employed for determining the correlation value of the coded block. However, the absolute difference between the selected pixel and non-selected pixels which are not adjacent but which surround the selected pixel may be used.

Alternatively, not only pixels spatially adjacent to the selected pixel, but also pixels temporally adjacent to the selected pixel, may be used.

As discussed above, the sum of the absolute differences of the pixel values as the coded value concerning the current coded block calculated by the difference-value calculating unit 164 is supplied to the comparator 168 and also to the switch 166, which is normally turned off.

Upon receiving the sum of the absolute differences of the current coded block from the difference-value calculating unit 164, the comparator 168 determines in step S46 whether the sum of the absolute differences is smaller than the value stored in the minimum difference-value storage register 167.

If the outcome of step S46 is yes, i.e., if the correlation value of the current coded block obtained by performing an exclusive-OR between the selected pixels and the EX-OR data n is greater than the previously obtained correlation value concerning the current coded block, it can thus be determined that the current coded block has most probably been decoded into the original block. Then, the process proceeds to step S47 in which the comparator 168 temporarily changes the switches 165 and 166 from off to on, and the process proceeds to step S48.

In step S47, the EX-OR data n output from the EX-OR data register 163 is supplied to the optimal EX-OR data storage register 169 via the switch 165. The value stored in the optimal EX-OR data storage register 169 as the optimal EX-OR data n_min is overwritten by the EX-OR data n from the EX-OR data register 163 as new optimal EX-OR data n_min (as the optimal bit stream used for computing an exclusive-OR with the selected pixels in decoding the current coded block).

In step S47, the sum of the absolute differences is supplied from the difference-value calculating unit 164 to the minimum difference-value storage register 167 via the switch 166. The value stored in the minimum difference-value storage register 167 is overwritten by the sum of the absolute differences output from the difference-value calculating unit 164 as a new minimum sum of the absolute differences (as the maximum correlation concerning the current coded block).

In contrast, if it is determined in step S46 by the comparator 168 that the sum of the absolute differences from the difference-value calculating unit 164 is not smaller than the value stored in the minimum difference-value storage register 167, i.e., if the correlation value concerning the current coded block obtained by performing an exclusive-OR between the selected pixels and the EX-OR data n is not greater than the previously obtained correlation value concerning the current coded block, it is found that the current coded block has not most probably been decoded into the original block. Thus, the process proceeds to step S48 by skipping step S47. In step S48, the EX-OR data n is incremented by one in the EX-OR data register 163.

Subsequently, a determination is made in step S49 whether the EX-OR data n is equal to or smaller than the maximum value $2^{th-r}-1$ which can be represented by the number of bits assigned to the pixel value. If so, the process returns to step S44, and the corresponding processing is repeated.

If the outcome of step S44 is no, namely, the EX-OR data n has been used for calculating the correlation value (sum of the absolute differences) concerning the current coded block as all the values ranging from 0 to $2^{th-r}-1$, the process proceeds to step S50. In step S50, an exclusive-OR is computed between the selected pixels and the optimal EX-OR data n_min, thereby decoding the current coded block into the original block and also decoding the additional information embedded in the coded block.

More specifically, the optimal EX-OR data storage register 169 supplies the optimal EX-OR data n_min to the exclusive-OR arithmetic unit 162. In the exclusive-OR arithmetic unit 162, an exclusive-OR is computed between each of the normal bit-stream pixels and each of the reversed bit-stream pixels of the current coded block and the optimal EX-OR data n_min in a manner similar to step S44, thereby decoding the original image block. The decoded image block is supplied to the decoded-image memory 171 and is stored in a corresponding address.

The optimal EX-OR data storage register 169 supplies the optimal EX-OR data n_min stored therein to the decoded additional-information memory 170 as the decoded additional information embedded in the current coded block.

Thereafter, the process proceeds to step S51 in which it is determined whether there are any more blocks to be processed in the exclusive-OR arithmetic unit 162 (hereinafter sometimes referred to as "unprocessed blocks"). If the outcome of step S51 is yes, one of the unprocessed blocks is set to be the current coded block (for example, the subsequent current coded block in raster scanning order). The process then returns to step S42, and the corresponding processing is repeated.

Conversely, if it is found in step S51 by the exclusive-OR arithmetic unit 162 that there are no more unprocessed blocks, namely, if all the decoded blocks for one frame are stored in the decoded-image memory 171, and if the decoded additional information embedded in the frame is stored in the decoded additional-information memory 170, the decoded image is read from the decoded-image memory 171, and the decoded additional information is read from the decoded additional-information memory 170.

Thereafter, it is determined in step S52 whether there are any more embedded image frames to be processed in the block dividing unit 161. If so, the process returns to step S41, and the corresponding processing is repeated.

If it is found in step S52 that there are no more embedded image frames to be processed by the block dividing unit 161, the decoding processing is completed.

According to the foregoing description, in the second embodiment, as well as in the first embodiment, the coded image data embedded with the additional information is decoded into the original image and into the additional information by utilizing the correlation of the image. Thus, an overhead required for performing the decoding operation is not incurred. Therefore, the decoded image (reproduced image) is free from the degradation of the image quality which is conventionally suffered from embedding the additional information.

A simulation test was conducted as follows. A natural image, each pixel having eight bits, was divided into 4×4-pixel blocks, and the embed-coding operation was performed (in this case, since eight-bit additional information can be embedded into one block, the embedding rate of additional information is 8 bits/16 pixels). Then, the decoding operation was performed on the embedded image, and 98.74% of the pixel values were correctly decoded.

Another simulation test was conducted as follows. A natural image similar to that used in the above-described simulation test was divided into 2×2-pixel blocks, and the embed-coding operation was performed (in this case, the embedding rate of additional information is 8 bits/4 pixels, which is four times as high as that of the above-described simulation test). Then, the decoding operation was performed on the embedded image, and 79.12% of the pixel values were correctly decoded.

Accordingly, if one block is formed of a greater number of pixels, the pixels can be decoded with higher precision. On the other hand, the amount of additional information which can be embedded into one frame, i.e., the embedding rate, is decreased. In contrast, if one block is formed of a smaller number of pixels, the embedding rate is increased, but the decoding precision is lowered. Thus, the number of pixels forming one block is desirably determined in view of the tradeoffs of the embedding rate and the decoding precision.

In the foregoing embodiment, in the embed-coding processing, the reversed bit-stream additional information is used for computing an exclusive-OR with the values of the reversed bit-stream pixels, as illustrated in FIG. 15. However, an exclusive-OR may be computed between the values obtained by reversing the order of the reversed bit-stream pixels and the additional information.

Figure 20:
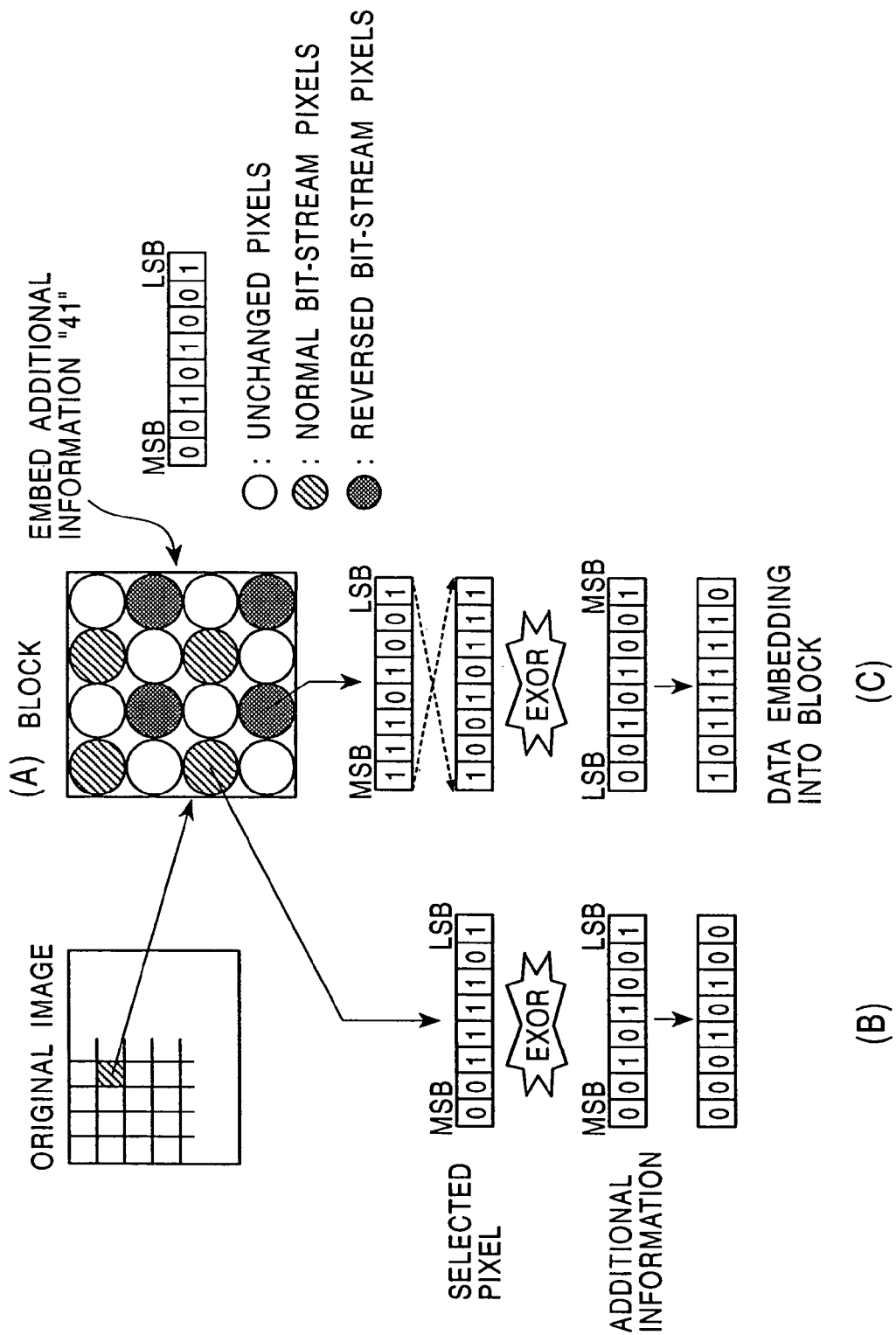
FIG. 20 illustrates pixels to be selected for each image block in performing the decoding operation shown in FIG. 17 and also illustrates the data embedding operation by computing an exclusive-OR between one of the selected pixels and additional information and by computing an exclusive-OR between one of the reversed selected pixels and the additional information.

For example, it is now assumed, as illustrated in FIG. 20, that the pixel value is represented by eight bits, and that the value of a normal bit-stream pixel is 00111101B and the value of a reversed bit-stream pixel is 10010111B. It is also assumed that the additional information is 00101001B (=41). Then, an exclusive-OR is computed between the normal bit-stream pixel 00111101B and the bit stream 00101001B representing the additional information, resulting in 00010100B, as shown in (B) of FIG. 20, which is the same as (B) of FIG. 15. On the other hand, an exclusive-OR is computed between the bit stream 10010111B obtained by reversing the above-described reversed bit-stream pixel 11101001B and the bit stream 00101001B representing the additional information, thus resulting in 10111110B, as shown in (C) of FIG. 20.

In this case, however, in the decoding operation, an exclusive-OR is first computed between the reversed bit-stream pixels and the EX-OR data n, and then, the obtained bit stream is reversed. By using the resulting value as the pixel value, the correlation value is calculated.

The above-described processes shown in FIGS. 6, 10, 14, and 17 may be executed by hardware or by software. If they are executed by using software, the corresponding software program may be installed into a dedicated-hardware computer built into a pixel processing apparatus or a learning apparatus, or installed into a general-purpose computer which performs various processing by installing the corresponding programs.

Figure 21A:
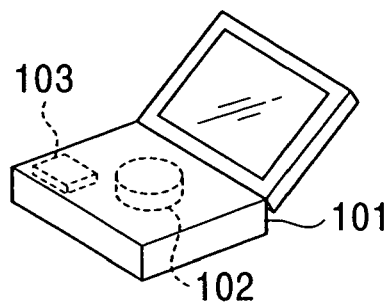
FIG. 21A illustrates a computer into which a program implementing the processing of the present invention is to be installed.
Figure 21B:
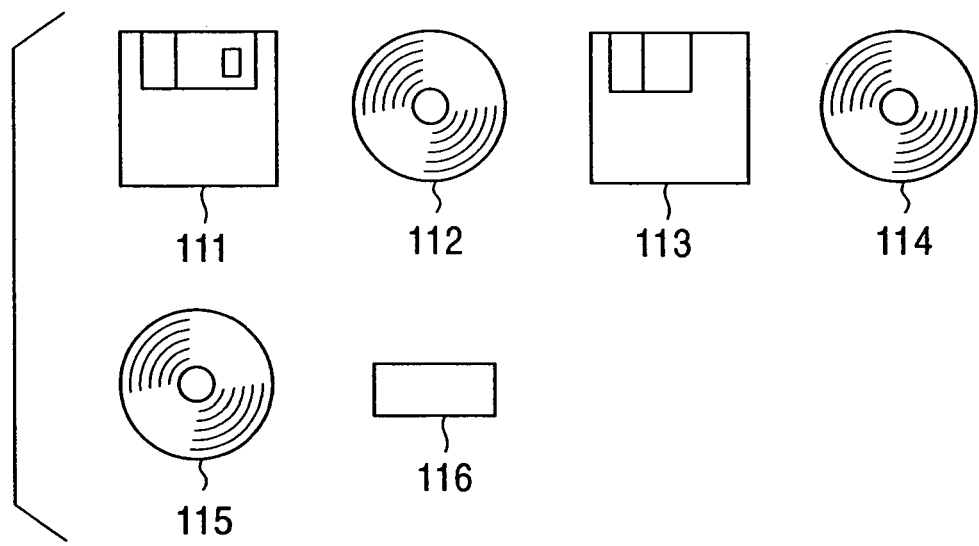
FIG. 21B illustrates storage media in which a program implementing the processing of the present invention is to be stored.
Figure 21C:
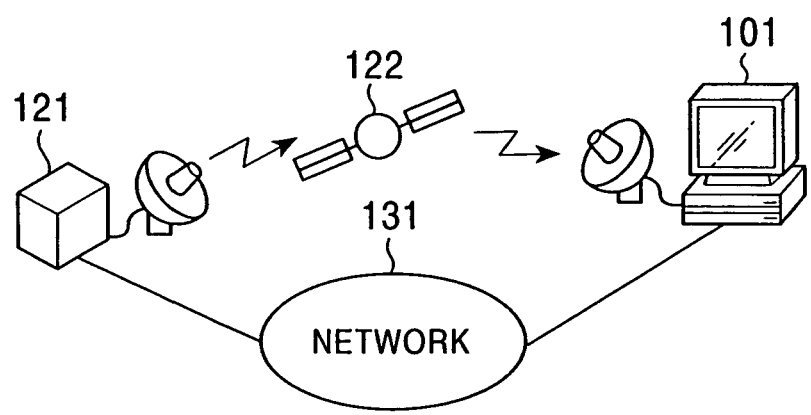
FIG. 21C illustrates a program implementing the processing of the present invention being distributed into a computer via a satellite or a network.

A description is now given, with reference to FIGS. 21A, 21B, and 21C, of media used for installing a program implementing the above-described processes into a computer and for making the program executable by the computer.

The program may be provided to users, as illustrated in FIG. 21A, by being installed in a hard disk 102 or a semiconductor memory 103, which serves as a storage medium, built in a computer 101.

Alternatively, the program may be provided as package software, as shown in FIG. 21B, by being temporarily or permanently installed in a storage medium, such as a floppy disk 111, a compact disc-read only memory (CD-ROM) 112, a magneto optical (MO) disk 113, a digital versatile disc (DVD) 114, a magnetic disk 115, or a semiconductor memory 116.

Alternatively, as shown in FIG. 21C, the program may be transferred by radio from a download site 121 to the computer 101 via a digital-satellite-broadcast artificial satellite 122, or transferred by cable to the computer 101 via a network 131, such as a local area network (LAN) or the Internet, and may be stored in the hard disk 101 built in the computer 101.

The media discussed in the specification encompass the broadest concept including the above-described media.

The steps forming the program provided by the media may be executed according to the time-series order described in the specification. Alternatively, the above-described steps may not be executed in time-series order, and may be executed individually or in parallel (for example, object processing).

Figure 22:
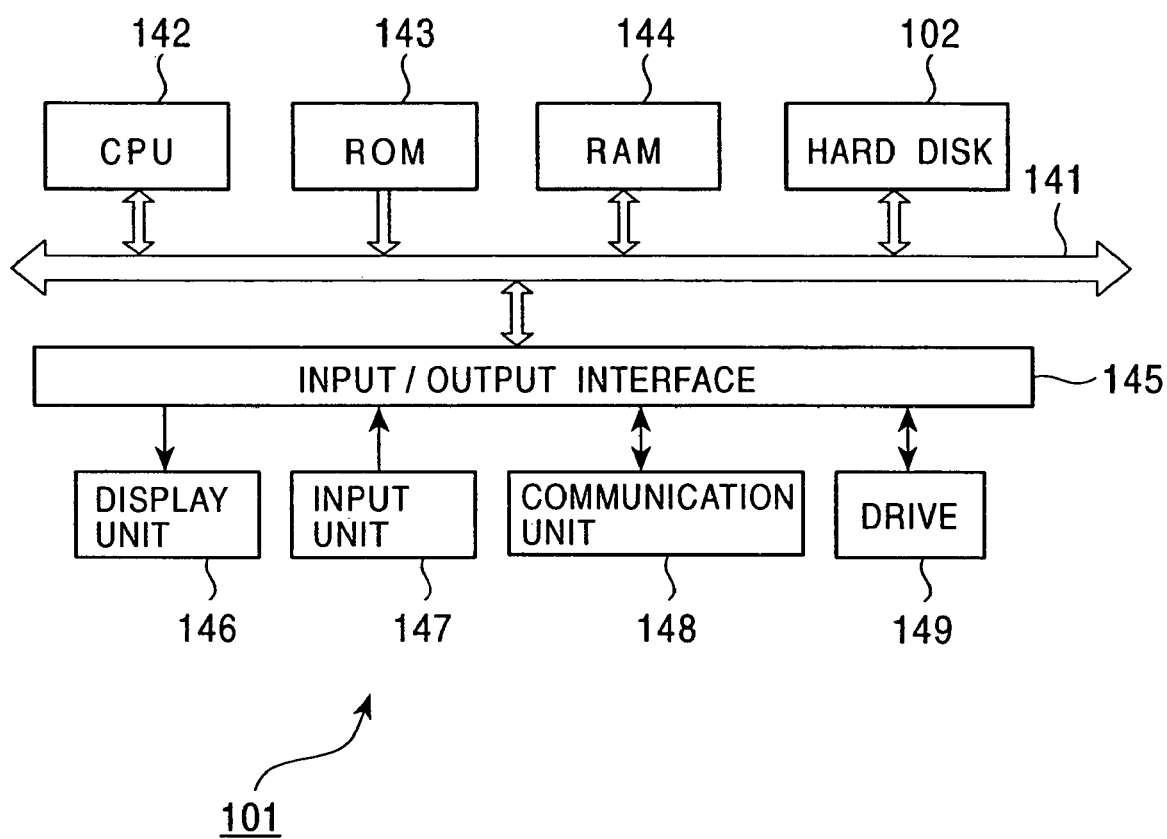
FIG. 22 is a block diagram illustrating an example of a computer into which a program implementing the processing of the present invention is to be installed.

FIG. 22 illustrates an example of the configuration of the computer 101 shown in FIGS. 21A and 21C.

The computer 101 has a built-in central processing unit (CPU) 142, as shown in FIG. 22. An input/output interface 145 is connected to the CPU 142 via a bus 141. Upon inputting an instruction from a user by operating an input unit 147, which consists of a keyboard, a mouse, etc., via the input/ output interface 145, the CPU 142 executes a program stored in a read only memory (ROM) 143, which corresponds to the semiconductor memory 103 shown in FIG. 21A. Alternatively, the CPU 142 loads into a random access memory (RAM) 144 a program stored in the hard disk 102, a program transferred from the satellite 122 or the network 131 to a communication unit 148 and installed in the hard disk 102, or a program read from the floppy disk 111, the CD-ROM 112, the MO disk 113, the DVD 114, or the magnetic disk 115 loaded in a drive 149 and installed in the hard disk 102. Then, the CPU 142 executes the loaded program. The CPU 142 then suitably outputs the processed result to a display unit 146 formed of, for example, a liquid crystal display (LCD), via the input/output interface 145.

According to the first and second embodiments, in performing the embed-coding processing and the decoding processing, an image is divided into 4×4-pixel blocks. However, the number of pixels forming one block is not restricted. Additionally, the configuration of the block is not limited to a square or rectangular shape.

Although in the foregoing embodiments additional information is embedded into all the blocks forming a frame, it may be embedded into some of the blocks forming a frame. In this case, the pixels forming the blocks without the additional information may be used for calculating correlation values in decoding the blocks embedded with the additional information.

In the aforementioned embodiments, one frame is divided into blocks, and additional information is embedded into the divided blocks. However, in embedding additional information, each frame may be used as one block rather than being divided into blocks, or a plurality of frames may be used as one block.

In the second embodiment, if a pixel value is represented by a plurality of components, such as YUV or RGB, an exclusive-OR may be computed between all the components and the same additional information. Alternatively, an exclusive-OR may be computed between the individual components and different items of additional information.

In the second embodiment, some of the pixels forming the block are selected according to a checkerboard pattern, and the additional information is embedded into the selected pixels. However, some of the pixels used for embedding the additional information may be selected according to a different pattern. Additionally, although in the second embodiment one half the pixels forming the block are selected, and an exclusive-OR is computed between the values of the selected pixels and the additional information, the number of pixels used for computing an exclusive-OR is not restricted to one half the pixels forming the block. As stated above, however, in decoding the pixels embedded with additional information, the correlation value may be desirably determined by using the pixels without the additional information. The correlation between pixels becomes smaller as the pixels are spatially or temporally farther from each other. Therefore, in order to perform the correct decoding operation, the pixels into which additional information is to be embedded may be selected in such a manner that they are sparsely located spatially or temporally.

In the second embodiment, the normal bit-stream pixels and the reversed bit-stream pixels are selected so that they are alternately located in the diagonal direction of the selected pixels. However, the normal bit-stream pixels and the reversed bit-stream pixels may be arranged according to a different pattern.

In the second embodiment, some of the selected pixels are determined to be the normal bit-stream pixels, while the remaining selected pixels are determined to be the reversed bit-stream pixels, and an exclusive-OR is computed between each of the pixels and the additional information. However, all the selected pixels may be determined to normal bit-stream pixels or reversed bit-stream pixels.

Although in the second embodiment additional information is embedded by computing an exclusive-OR between pixel values and the additional information, another logical operation may be performed on the pixels. However, a computed result is desirably restored to the original value by performing the same type of logical operation as that used for performing the embed-coding operation, such as an exclusive-OR.

The type of additional information is not particularly limited. For example, images, sound, text, computer programs, and other types of data may be embedded as the additional information. Part of the images stored in the image database 1 may be used as the additional information, and the remaining images may be supplied to the frame memory 31. In this case, the additional information can be embedded into the images to be coded, thereby implementing the image compression.

What is claimed is:

1. An image processing apparatus for embedding information into image data, comprising:
  a selection unit configured to select some pixels forming the image data; and a changing unit configured to embed the information into the pixels selected by said selection unit by swapping bits of values of the selected pixels according to the information, wherein original values of the selected pixels are reproduced from the pixels in which the information is embedded with no errors between the reproduced values and the original values.

2. An image processing apparatus according to claim 1, wherein said changing unit embeds the information into the selected pixels by rotating the bits of the selected pixel values according to the information.

3. An image processing apparatus according to claim 2, wherein said changing unit rotates some of the selected pixels in a direction from a least significant bit to a most significant bit, and rotates the other selected pixels in a direction from the most significant bit to the least significant bit.

4. An image processing apparatus according to claim 1, further comprising a dividing unit configured to divide the image data into a predetermined image block, wherein said selection unit selects some of the pixels forming the image block.

5. An image processing apparatus according to claim 4, wherein said changing unit embeds the information into the selected pixels in units of blocks by swapping the bits of the selected pixel values according to a single piece of information per image block.

6. An image processing apparatus according to claim 5, wherein said changing unit rotates some of the selected pixel values forming each of the image blocks in a direction from a least significant bit to a most significant bit and rotates the other pixel values forming the image block in a direction from the most significant bit to the least significant bit according to the information per image block.

7. An image processing method of an image processing apparatus using a processor to perform embedding, selecting, and producing information with image data, comprising the steps of:

selecting some pixels forming the image data;

embedding the information into the pixels selected in said selection step by swapping bits of values of the selected pixels according to the information; and reproducing original values of the selected pixels from the pixels in which the information is embedded with no errors between the reproduced values and the original values.

8. A computer readable storage medium for storing a computer program for embedding information into image data, said program comprising the steps of:

selecting some pixels forming the image data;

embedding the information into the pixels selected in said selection step by swapping bits of values of the selected pixels according to the information; and reproducing original values of the selected pixels from the pixels in which the information is embedded with no errors between the reproduced values and the original values.

\* \* \* \* \*